US009602376B2

(12) United States Patent
Wallbaum et al.

(10) Patent No.: US 9,602,376 B2
(45) Date of Patent: Mar. 21, 2017

(54) DETECTION OF PERIODIC IMPAIRMENTS IN MEDIA STREAMS

(71) Applicant: VoIPFuture GmbH, Hamburg (DE)

(72) Inventors: Michael Wallbaum, Hamburg (DE); Michael Krüger, Hamburg (DE)

(73) Assignee: VoIPFuture GmbH, Hamburg (DE)

( * ) Notice: Subject to any disclaimer, the term of this patent is extended or adjusted under 35 U.S.C. 154(b) by 0 days.

(21) Appl. No.: 14/439,668

(22) PCT Filed: Nov. 2, 2012

(86) PCT No.: PCT/EP2012/004572
§ 371 (c)(1),
(2) Date: Apr. 30, 2015

(87) PCT Pub. No.: WO2014/067540
PCT Pub. Date: May 8, 2014

(65) Prior Publication Data
US 2015/0281025 A1 Oct. 1, 2015

(51) Int. Cl.
*H04L 12/26* (2006.01)
*H04L 29/06* (2006.01)
*H04L 12/24* (2006.01)

(52) U.S. Cl.
CPC ........ *H04L 43/0829* (2013.01); *H04L 43/062* (2013.01); *H04L 65/80* (2013.01);
(Continued)

(58) Field of Classification Search
CPC ... H04L 43/0829; H04L 43/062; H04L 65/80; H04L 43/16; H04L 41/5038;
(Continued)

(56) References Cited

U.S. PATENT DOCUMENTS

| 7,710,879 B2 * | 5/2010 | Clark | H04L 12/2602 370/237 |
| 8,027,264 B2 * | 9/2011 | Erman | H04L 41/5009 370/250 |

(Continued)

FOREIGN PATENT DOCUMENTS

| EP | 1802035 | 6/2007 |
| WO | WO 01/80492 | 10/2001 |
| WO | WO 2014/067540 | 5/2014 |

OTHER PUBLICATIONS

International Search Report and the Written Opinion Dated May 29, 2015 From the European Patent Office Re. Application No. PCT/EP2012/004572.

*Primary Examiner* — Chi H Pham
*Assistant Examiner* — Weibin Huang

(57) ABSTRACT

The invention relates to methods and systems for detecting periodic impairments of media streams of real-time communication sessions within a packet-switched network. The invention is performed in a passive monitoring system monitoring a plurality of media streams providing quality data records for each monitored media stream and for predefined time intervals. For each media stream a frequency distribution is generated, which is indicative of the number of good quality data records between two quality data records indicative of impairment. If a maximum exists in the media stream's frequency distribution for a given number of consecutive good quality data records, the stream is determined to be periodically impaired and said given number of consecutive good quality data records for which the maximum exists indicates the periodicity in the impairment of the media stream.

20 Claims, 11 Drawing Sheets

(52) U.S. Cl.
CPC ...... *H04L 41/5038* (2013.01); *H04L 41/5067* (2013.01); *H04L 43/067* (2013.01); *H04L 43/087* (2013.01); *H04L 43/0835* (2013.01); *H04L 43/0858* (2013.01); *H04L 43/12* (2013.01); *H04L 43/16* (2013.01); *H04L 43/50* (2013.01)

(58) Field of Classification Search
CPC ............... H04L 41/5067; H04L 43/067; H04L 43/0835; H04L 43/0858; H04L 43/087; H04L 43/12; H04L 43/50
See application file for complete search history.

(56) References Cited

U.S. PATENT DOCUMENTS

| | | | |
|---|---|---|---|
| 8,958,486 B2* | 2/2015 | Rodriguez | H04L 1/0041 375/240.13 |
| 2008/0084969 A1* | 4/2008 | Moore | H04L 47/10 379/52 |
| 2008/0198754 A1* | 8/2008 | Savoor | H04L 12/2697 370/245 |
| 2009/0164550 A1* | 6/2009 | Rahrer | H04L 41/0677 709/202 |
| 2009/0238085 A1* | 9/2009 | Khanduri | H04L 41/5009 370/252 |

* cited by examiner

DETECTION OF PERIODIC IMPAIRMENTS IN MEDIA STREAMS

RELATED APPLICATION

This application is a National Phase of PCT Patent Application No. PCT/EP2012/004572 having International filing date of Nov. 2, 2012, the contents of which are incorporated by reference as if fully set forth herein in their entirety.

FIELD OF THE INVENTION

The invention relates to methods and systems for detecting periodic impairments of media streams of real-time communication sessions within a packet-switched network. The methods may be implemented by means of software, hardware or a combination thereof.

TECHNICAL BACKGROUND

VoIP Services

Voice over IP ("Voice over IP"—IP denoting the Internet Protocol) networks are packet-switched phone networks. In contrast to their circuit-switched predecessors (e.g. the PSTN) the control plane (signaling information—who calls whom) may use a different path through the network than the media plane (media—the call content). The media plane is sometimes also referred to as the user plane. VoIP services can be considered to consist of a signaling plane and a media plane. On the signaling plane various protocols describe the communication session (call) flow in terms of involved parties, intermediary VoIP entities (i.e. VoIP proxies, routers) and the characteristics of the VoIP service features. The media plane typically carries the media information (i.e. audio and/or video data) between the involved parties. Neither the media plane nor the signaling plane alone is sufficient to implement and provide a VoIP service. On the signaling plane protocols like SIP (see IETF RFC 3261, "SIP: Session Initiation Protocol", available at http://www.ietf.org) or ITU-T recommendation H.323 (see H.323, "Packet-based multimedia communications systems", Edition 7, 2009, available at http://www.itu.int) are commonly used, whereas protocols like RTP (Real-time Transport Protocol, see IETF RFC 3550, "RTP: A Transport Protocol for Real-Time Applications", available at http://www.ietf.org), MSRP (see IETF RFC 4975, "The Message Session Relay Protocol (MSRP)", available at http://www.ietf.org) or ITU recommendation T.38 (see T.38, "Procedures for real-time Group 3 facsimile communication over IP networks", Edition 5 (2007) or Edition 6 (2010), available at http://www.itu.int) may be present on the media plane.

In contrast to the traditional PSTN (Public Switched Telephone Network) network both planes may be on different infrastructure using different protocols and even take different routes through a network.

Measuring Voice Quality

Today two main categories exist for measuring voice quality. The first method is called the subjective method, which involves real human test persons who express their opinion about their perceived voice quality. The average quality rating from all test persons is expressed as the Mean Opinion Score (MOS). The MOS score is expressed as an Absolute Category Rating (ACR) which defines a 5 point scale from 5 (excellent), 4 (good), 3 (fair), 2 (poor) to 1 (bad). An attempt for repeatable measurement results has been made, by defining the ITU-T P.800 (see http://www.itu.int/rec/T-REC-P.800-1996084) industry recommendation, which provides normative speech samples to be used for the subjective test method. The results of the subjective test method are further separated in listening and conversational quality. This is expressed by further specifying the type of the MOS score:

$MOS_{LQS}$ (Listening Quality—Subjective)
$MOS_{CQS}$ (Conversational Quality—Subjective)

Since the subjective method does involve human beings, the method is not suited to be automated by test equipment.

The second method for measuring voice quality is called objective method. This method has been designed for automated voice measurement by test and monitoring equipment. The goal of this method is to provide reliable, objective and repeatable measurement results for a voice quality rating that is similar to the subjective method performed by real human beings. Similar to the subjective method, MOS scores for listening and conversational quality have been defined:

$MOS_{LQO}$ (Listening Quality—Objective)
$MOS_{CQO}$ (Conversational Quality—Objective)

The voice quality may also be determined using methods, as for example known from the industry standards ITU-T G.107 E-Model and ITU-T P.564, discussed below. In case subjective voice quality is estimated, this is typically indicated in the index of the MOS value, where an "E" denotes the result to be estimated:

$MOS_{LQE}$ (Listening Quality—Estimated)
$MOS_{CQE}$ (Conversational Quality—Estimated)

Intrusive and Non-Intrusive Monitoring of Voice Quality

The objective MOS scores can be measured following two very different approaches. The first approach is an intrusive or active method, where the speech samples defined in ITU-T P.800 will be encoded by a VoIP sender, transferred over the packet based IP network and then decoded by the VoIP receiver. The MOS score is then calculated by comparing the known speech input signal from the VoIP sender with the received speech signal from the receiver. The method is called intrusive or active because the test signal is transferred in addition to eventually other VoIP traffic available on the network. Active VoIP monitoring can be used for VoIP readiness tests, prior deployment of a VoIP infrastructure because no other VoIP traffic is required, since the test equipment does generate the test data used for measurement itself. Active testing has been defined by the industry recommendation ITU-T P.862 PESQ (see http://www.itu.int/rec/T-REC-P.862-2001024) and ITU-T P.862.1 (see http://www.itu.int/rec/T-REC-P.862.1-200311-I). A benefit of this method is that all factors that can have an impact on VoIP quality are being considered, like the VoIP endpoint, codec, noise, delay, echo and the effects of the IP network. The drawback of active testing is that real voice testing of real calls performed by real users is not measured. Because of the transient nature of VoIP impairments in IP networks, it is quite possible that the results of active testing do not reflect the quality experienced by real users.

The second approach is the passive measurement method. With passive monitoring real VoIP calls are measured so that no artificial traffic needs to be generated. The industry standards ITU-T G.107 E-Model (see http://www.itu.int/rec/T-REC-G.107-201112-I) and ITU-T P.564 (see http://www.itu.int/rec/T-REC-P.564-200711-I) define recommendations for passive monitoring of VoIP traffic in IP networks.

FIG. 11 provides an overview on the different measurement concepts, and where they are being applied. Passive monitoring is measuring real VoIP calls without using a reference speech signal. This also means that deployment of passive monitoring solutions is often easier, since only one location has to be visited. Since the speech payload of live calls is unknown, only those statistics/metrics can be considered that are independent from the speech payload. Mainly these metrics are loss, jitter and delay.

A single-server non-intrusive, passive monitoring system that is capable of implementing the ITU-T G.107 standard, considers effects visible to the monitoring system via deep packet inspection and packet flow analysis.

A minimal non-intrusive, passive monitoring system is made from a monitoring probe and a test access port (TAP) to connect to the network to be tested, and optionally a post-processing platform to visualize the measurement results of the monitoring probe. A TAP is a passive network device, which can mirror network traffic without interference of the original network traffic, by creation of a copy of every IP packet. It provides a copy of every packet send or received on the network, by separating the full-duplex network link, into two half-duplex network links, which are then connected to a specialized packet capture cards (network interface card—NIC) installed in the probe. These specialized packet capture card are capable of receiving and processing packets on the physical interface and to provide them to the application layer, nearly without requiring CPU processing time and operation system functionality.

FIG. 12 shows an exemplary monitoring system of a passive non-intrusive monitoring solution deployed in a VoIP network. FIG. 12 indicates possible mid-point monitoring locations (TAP positions) within a carrier network. Optionally multiple monitoring probes can be deployed in the network so that RTP streams can be evaluated end-to-end. Furthermore the impact of installed network hardware like an SBC or media-gateway on the RTP stream quality can be analyzed.

As mentioned above, passive non-intrusive monitoring solutions for VoIP traffic are based on packet flow analysis of RTP streams, which are used to transfer speech over IP networks. This analysis can be performed either as an integral part of a VoIP device like an IP-phone, media-gateway, or in mid-point somewhere in the network between the calling parties. Both approaches have advantages and disadvantages. If the analysis is integrated into a VoIP device, additional important information becomes available to the packet flow analyzer like the size of the de-jitter buffer, and if received packets are considered for further processing or discarded due to late arrival (large jitter). The availability of this information can be a major advantage in accurately estimating the VoIP quality for the end user of the device.

Disadvantages are that devices may only have a limited view on the full VoIP service (e.g. an IP-phone) because only the incoming or outgoing calls will be subject to monitoring. All other VoIP traffic directed to other end points would be unavailable, unless the flow analysis is integrated into every IP-phone used, which is practically hard to achieve. Another disadvantage is that VoIP devices are service specific hardware with limited performance and resources available for additional data processing for which they have not been designed. Packet flow analysis can be a very CPU intensive task and the results have to be stored somewhere. CPU resources and disk space is something that is not sufficiently available on IP-phones or media-gateways.

Because of these limitations, a monitoring solution based on passive mid-point monitoring as shown in FIG. 11 and FIG. 12 may be advantageous as monitoring is performed on copies of the network traffic, which is produced by a network TAP to which the monitoring probes are connected as exemplified in FIG. 1. This way the quality measurement doesn't have any impact on the real network traffic, is hardware and manufacturer independent, while being able to produce a full view of all live calls being transferred at the network location under test.

There are however some cases where passive monitoring does not allow detecting every problem. In those cases a full packet capture is often the only reasonable approach to solve the issue. The amount of data that would need to be processed when full packet capture to disk is used is enormous even on a 1 GB/s Ethernet connection and it is not possible from an economic point of view to process this amount of data in real-time, so that results could be used to dynamically adapt to impairments. Practical experience has also shown that only a few VoIP calls are experiencing quality degradations at the same time, so that it would be a huge waste of resources to perform analysis on a full packet capture, just to find out that the majority of the VoIP sessions have no quality issues at all.

For example, consider a 1 GBit/s Ethernet full-duplex link fully utilized by VoIP sessions using a G.711 codec for speech encoding with a packet interval of 20 ms (160 Bytes of payload in every packet). In this case approximately 1.000.000 RTP packets per second generated from 10.500 concurrent VoIP sessions have to be dealt with. A VoIP packet received at the network interface by the monitoring probe will typically consist of the MAC header (Ethernet header), the IP header, the UDP header and a RTP header followed by the actual payload, the speech data. Overall the size of a single RTP packet on the data link layer using a G.711 codec and 20 ms packet interval is 214 Bytes, which means that at least 214 MBytes of data have to be stored per second to capture all packets on a 1 GBit/s Ethernet link fully utilized by VoIP sessions. In addition to the packet data itself, a packet capture header may need to be added depending on the capture format being used, which would be further increasing the amount data to capture per second. The amount of hardware and processing power required to process this number of bytes is just too high to make economic sense for a larger deployment of passive, mid-point monitoring solutions in VoIP networks.

FIGS. 11, 12 and 1 discussed above show the basic setup of a passive monitoring system. Typically, passive monitoring systems determine (transport-related) metrics of the monitored media streams, such as interarrival time of the packets, packet jitter, packet loss, packet delay, etc. A more advanced passive monitoring system, which allows for the determination and further analysis of metrics on a time-interval basis to identify many different types of impairments and problems, is for example known from the applicant's application PCT/EP2012/000042.

SUMMARY OF THE INVENTION

The object of the invention is to improve detection and/or discrimination of problems/impairments of media streams of real-time communication sessions within a packet-switched network. Another, more specific object of the invention is to provide an improved identification and/or discrimination of problems introduced by some device or endpoint being a part of the network path used to carry media streams of real-time communication sessions within a packet-switched network.

At least one of the objects of the invention is solved by the subject matter of the independent claims. Advantageous embodiments of the invention are subject to the dependent claims.

One aspect of the invention is to detect events in the media streams that show a periodic behavior. The presence of periodic events (or non-periodic events) may be detected for each monitored media stream. The media streams may be monitored in a passive (mid-point) monitoring system. According to this aspect of the invention, a frequency distribution for the media stream is generated. The frequency distribution is indicative of the numbers of good quality data records between respective pairs of quality data records indicative of an event of the respective media stream that is to be tracked by monitoring. In case the frequency distribution of the media stream shows a maximum, the media stream is determined to be periodically impaired. The location (bin) of the maximum in the frequency distribution may indicate the periodicity in the impairment of the media stream.

In another aspect of the invention, in case multiple monitored media streams show a periodic impairment, the invention further suggests a mechanism for identifying media streams showing the same periodicity in their impairment at the same point in time. This identification of media streams showing the same event at the same time and periodicity may be advantageously using a modulus calculated for each periodically impaired media stream based on the periodicity of the event. The event's modulus of the media stream represents the periodicity relative to a time reference, which makes it possible to detect other media streams in which the event occurs at the same point in time. By comparing the moduli calculated for the periodically impaired media streams, media streams showing a periodic impairment with the same periodicity and at the same point in time will have the same modulus, which facilitates their identification.

One embodiment of the invention relates to a method for detecting periodic impairments of media streams of real-time communication sessions within a packet-switched network. According to this method comprising a passive monitoring system monitors a plurality of media streams. The monitoring may comprise (continuously) generating, for predefined time intervals, quality data records for each monitored media stream. Each quality data record is indicative of a determined media stream quality of the respective media stream within the respective predefined time interval. Further according to this method a frequency distribution is generated for each media stream. The frequency distribution of the respective media stream indicates the number of good quality data records between respective pairs of quality data records indicative of an impairment of the respective media stream in their corresponding time intervals. The method further determines whether a maximum exists in the media stream's frequency distribution for a given number of (consecutive) good quality data records. In case a maximum exists, the respective media stream is determined to be periodically impaired and the given number of (consecutive) good quality data records for which the maximum exists indicates the periodicity in the impairment of the media stream.

In another exemplary embodiment of the invention, the media stream's frequency distribution of impaired quality data records is generated by accounting for a respective quality data record of a media stream in the media stream's frequency distribution only, in case the determined media stream quality of the respective quality data record is indicating an impairment and there is at least a threshold number of (consecutive) good quality data records between the respective quality data record and the last quality data record of the media stream that has been accounted for in the media stream's frequency distribution.

In one exemplary implementation, the respective quality data record may be accounted for in a respective bin of the media stream's frequency distribution that is corresponding to the number of (consecutive) good quality data records between the respective quality data record and the last quality data record of the media stream that has been accounted for in the media stream's frequency distribution. Furthermore, periodicity of the impairment may be determined based on the number of quality data records accounted for in each respective bin of the media stream's frequency distribution. Accounting for a media stream may be for example realized by incrementing a counter corresponding to a respective bin of the media stream's frequency distribution that is corresponding to the number of (consecutive) good quality data records between the respective quality data record and the last quality data record of the media stream.

In another exemplary embodiment of the invention, a respective one of the generated quality data records is accounted for in the media stream's frequency distribution in case it indicates an impairment of the media stream below a threshold quality value. Otherwise (i.e. the quality data record indicates an impairment of the media stream that is not below the threshold quality value), the quality data record is considered a good quality data record.

According to a further exemplary embodiment of the invention, a respective media stream is determined to be periodically impaired, in case the maximum exists in the media stream's frequency distribution for a given number of (consecutive) good quality data records and, in addition, the number of accounted quality data records for a given number of (consecutive) good quality data records in the media stream's frequency distribution exceeds a threshold percentage of all quality data records that have been accounted for in the media stream's frequency distribution. The threshold percentage may be for example 50% or more.

In another exemplary embodiment of the invention, a periodic impairment of a respective media stream is only determined, in case the maximum exists in the media stream's frequency distribution for a given number of (consecutive) good quality data records and, in addition, the ratio between the total number of quality data records accounted for in the frequency distribution and the total number of quality data records of the media stream indicating an impairment of the media stream is below an impairment threshold ratio. The impairment threshold ratio may be for example 33%, 25% or another lower percentage/value.

In a more specific implementation of this embodiment, quality data records accounted for in the frequency distribution of a media stream may be quality data records of the respective media stream which indicate a determined media stream quality below a threshold quality value.

According to a further embodiment of the invention, the method further comprises maintaining a media stream context for each media stream, and adding a periodic impairment indicator to the media stream context upon termination of the respective media stream, wherein periodic impairment indicator indicates whether the respective media stream has been determined to having been subject to a periodic impairment or not.

Optionally, information on the determined periodicity of the impairment of the respective media stream may be further added to the media stream context, if the respective media stream has been determined to having been subject to a periodic impairment.

In one exemplary embodiment of the invention, a modulus of the periodic impairment of the respective media stream is added to the media stream context, if the respective media stream has been determined to having been subject to a periodic impairment. In one exemplary implementation, the modulus may be calculated by dividing the point in time of the start (or end) of the predetermined time interval of a quality data record accounted for in the frequency distribution of the media stream, expressed in seconds relative to a reference, by the periodicity of the impairment, expressed in seconds.

In a further embodiment of the invention, and in line with the second aspect of the invention, the method further comprises correlating media streams (potentially) subject to the same impairment at the same periodicity by identifying identical moduli in the media stream contexts of the media streams.

According to a further embodiment of the invention, monitoring a plurality of media streams received by the real-time passive monitoring system may comprise determining transport-related metrics for each of the media streams for respective predefined time intervals and estimating the media stream quality for each of the media streams within each respective predefined time interval. The determined media stream quality may be for example an estimated speech quality. In one exemplary implementation estimating the media stream quality may comprise determining a Mean Opinion Score (MOS) or R-factor value for each media stream in each predefined time interval.

In another exemplary implementation of the embodiment, the determined media stream quality is a determined transport quality determined based on at least one of packet loss, jitter, deviations in packet inter-arrival times, packet delay, and sequence errors in the received packet sequence.

Another embodiment of the invention relates to an implementation of the concepts of this invention in a system for detecting periodic impairments of media streams of real-time communication sessions within a packet-switched network. This system comprises one or more passive monitoring probe for monitoring a plurality of media streams, and for continuously generating, for predefined time intervals, quality data records for each monitored media stream. As noted previously, each quality data record may be indicative of a determined media stream quality of the respective media stream within the respective predefined time interval. The system may further comprise a processing unit for generating for each media stream a frequency distribution indicative of the number of good quality data records between respective pairs of quality data records indicative of an impairment of the respective media stream in their corresponding time intervals, and an analysis unit for determining whether a maximum exists in the media stream's frequency distribution for a given number of (consecutive) good quality data records. The analysis unit is adapted to determine the respective media stream to be periodically impaired, in case a maximum exists, and wherein the given number of (consecutive) good quality data records for which the maximum exists indicates the periodicity in the impairment of the media stream.

The individual units comprised by the monitoring system may be configured in different fashions. For example, in one implementation, the processing unit and/or the analysis unit could be comprised in each passive monitoring probe. In another exemplary configuration of the system, the processing unit and/or the analysis unit are comprised in a post-processing platform for processing the quality data records for each monitored media stream. However, also different configurations of the system are possible.

In a further embodiment of the invention, the system, respectively, the units thereof, may be adapted to perform the method for detecting periodic impairments of media streams of real-time communication sessions within a packet-switched network according to one of the different embodiments and implementations discussed herein.

Another embodiment of the invention relates to a computer readable medium storing instructions that, when executed by a processor of an apparatus, cause the apparatus to detect periodic impairments of media streams of real-time communication sessions within a packet-switched network, by monitoring by a passive monitoring system a plurality of media streams, wherein monitoring comprises continuously generating, for predefined time intervals, quality data records for each monitored media stream, wherein each quality data record is indicative of a determined media stream quality of the respective media stream within the respective predefined time interval; generating for each media stream a frequency distribution indicative of the number of good quality data records between respective pairs of quality data records indicative of an impairment of the respective media stream in their corresponding time intervals; and determining whether a maximum exists in the media stream's frequency distribution for a given number of (consecutive) good quality data records, wherein in case a maximum exists, the respective media stream is determined to be periodically impaired and the given number of (consecutive) good quality data records for which the maximum exists indicates the periodicity in the impairment of the media stream.

In another embodiment of the invention, the computer readable medium further stores instructions that, when executed by the processor, cause the apparatus to perform the steps of the method for detecting periodic impairments of media streams of real-time communication sessions within a packet-switched network according to one of the different embodiments and implementations discussed herein.

BRIEF DESCRIPTION OF THE FIGURES

In the following the invention is described in more detail in reference to the attached figures and drawings. Similar or corresponding details in the figures are marked with like reference numerals.

DETAILED DESCRIPTION OF THE INVENTION

Figure 1:
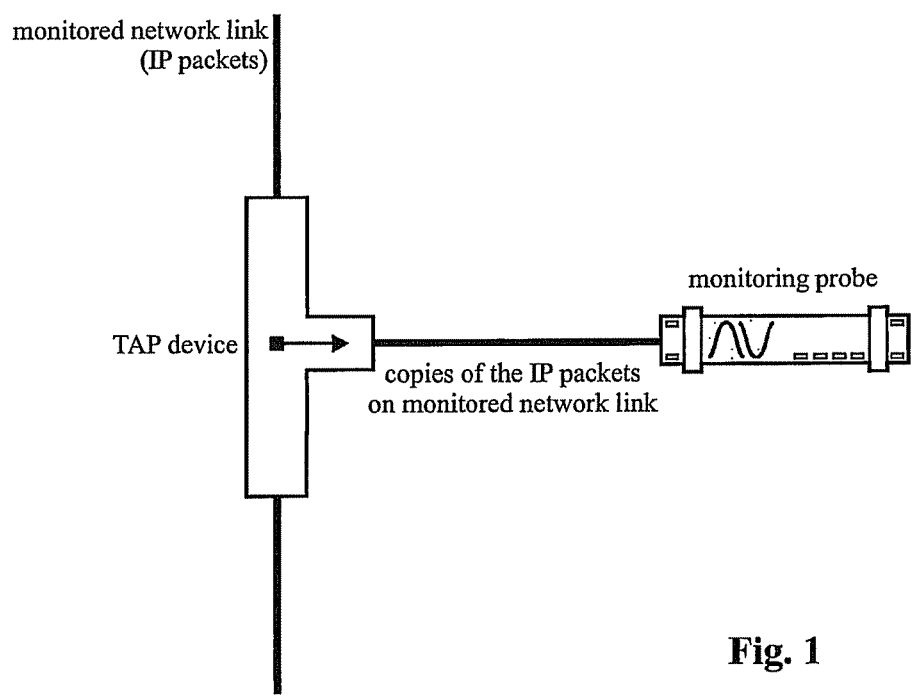
FIG. 1 shows how IP packets are forwarded as a packet copy produced by a tapping device to the passive monitoring probe for the purpose of passive quality monitoring of media streams in packet-switched networks.

The following paragraphs will describe various embodiments of the invention. For exemplary purposes only, most of the embodiments are outlined in relation to an IP-based communication system in which real-time media sessions (e.g. VoIP calls) are provided by means of a real-time session protocol, such as the RTP protocol. The principles of the invention may be readily applied to packet-switched networks, where streaming media, such as telephony (voice calls), video, video teleconference applications, etc., is provided by means of isochronous packet streams using a real-time session protocol. Also the use of the IP-protocol for the transport layer may not be mandatory, depending on the protocol stack being implemented.

It should be noted that in this document the use of the adjective "impaired" in connection with e.g. media stream or quality data record means that the media stream or quality data record shows an event for which the media stream is monitored. The same is meant when speaking of a media stream or a quality data record thereof showing an "impairment". Hence, the terms "event" and "impairment" are often used as synonyms, although it can be assumed in most (but not necessarily all technically meaningful) implementations of the invention that the monitored impairment/event of a media stream relates to identifying a (in some cases a perceptible) periodic degradation of the quality of the media stream.

As will become more apparent from the following paragraphs, the invention relates to an improved analysis of quality data records that are generated for respective given time intervals (also referred to as "impairment intervals" or "predefined time intervals") of the monitored media streams of one or more monitoring probes. This improved analysis allows the detection of periodic events occurring in the monitored media streams, or expressed differently, allows detection of periodic stream-level patterns in the monitored media streams. The presence of periodic events (as opposed to non-periodic events) may be detected for each monitored media stream, i.e. on a per-media stream basis.

Periodic events in the network are often an indication of impairments introduced to the media streams by a network component in the transmission path of the media streams, but it may also be able to detect configuration errors in the end-device(s). Being able to detect and identify network components that may introduce a reduction of the quality of service may allow providers to improve their network maintenance and/or performance, to be for example able to fulfill quality of service requirements subject to service level agreements (SLAs) among providers or quality of service guaranteed to customers.

One sub-aspect of the invention is to suggest a mechanism that allows for the detection of periodic events in the monitored media streams in real-time, i.e. at the same rate as the data arrives at the monitoring component (e.g. 1 GBit/s, 10 GBit/s, or higher rates). This may be of particular importance when implementing the detection of periodic events on the same component (e.g. a monitoring probe) that also performs (real-time) monitoring of the media streams (including media stream analysis and generation of quality data records for predefined intervals of the respective media streams). Generally, it should be noted that for performance reasons of the monitoring system, it is advantageous to perform the "processing" of the media streams on the fly (i.e. in real-time), since otherwise significant amounts of data need to be stored in the system and (and potentially transferred through the network) for (post) processing.

The presence of a periodic event or impairment within a media stream (and the periodicity thereof) may be for example detected using a frequency distribution of a count of consecutive quality data records not showing the event (which can also be referred as a frequency distribution of (consecutive) good segments of the media stream) between two (consecutive) quality data records (segments) showing the event. Note that this is equivalent to using a frequency distribution of the distances (in time or in terms of the number of quality data records or predetermined time intervals) between two (consecutive) quality data records (segments) showing the event. In case of monitoring the media streams for a periodic impairment, the frequency distribution of a respective media stream indicates the respective counts of the number of (consecutive) good quality data records in between two (consecutive) impaired quality data records of the stream. The earlier, first one of the two (consecutive) impaired quality data records may also be denoted the reference quality data record, while the other one of the two (consecutive) impaired quality data records will become the new reference quality data record, upon having accounted for the number of successive good quality data records in between them in the frequency distribution. The term "good quality data record" and "impaired quality data record" refer to quality data records not showing or showing the event of interest, respectively.

For example, a good quality data record may indicate a quality of the media stream (for the corresponding predefined time interval of the quality data record) that is above a threshold quality level. For example, when monitoring periodic degradations in the MOS value or R-value calculated for respective ones of the quality data records of a media stream, a good quality data record would refer to a quality data record having a MOS or R-value (determined for the data packets of the media stream within the predefined time interval to which the quality data record refers) above a threshold MOS value or R value, respectively. An impaired quality data record would refers to a quality data record having a MOS or R-value (determined for the data packets of the media stream within the predefined time interval to which the quality data record refers) that is below or equal to the threshold MOS value or R value, respectively. Other exemplary events that could be monitored for a periodic occurrence may be for example periodic increase of the packet jitter or packet loss above a threshold level.

Furthermore, since a high frequency of events (e.g. impairment) in a media stream may be considered a severe ongoing event of the media stream, rather than a periodic event, and may have another error source, it may be desirable to account in the frequency distribution only those counts of the number of (consecutive) good quality data records exceeding a threshold value. For example, the frequency distribution may only account the occurrence of at least a threshold number (e.g. 2, 3, 4, 5, . . . ) or more (consecutive) good quality records between (successive) two impaired quality data records. Hence, the frequency distribution may not consider the count of (consecutive) good quality data records below this threshold number.

The upper limit of the threshold number of (consecutive) good quality records between successive two impaired quality data records may also be configured, in consideration of various aspects. For example, in order to be able to detect a reoccurring event multiple times in a media session, the threshold number of (consecutive) good quality records may be selected to be equivalent to a periodicity (time period) that is significantly lower than the average duration of a media session in the monitored network. Please note that the average durations of media sessions may vary from network (provider) to network (provider) and may also depend on the media type. For example, the maximum periodicity, or its equivalent in terms of a maximum number of (consecutive) good quality records in between two impaired quality data records may be set to ⅓ or ¼ of the average duration of a media session in the monitored network.

A media stream may be considered to show a periodic event, in case the frequency distribution of the media stream shows a "clear" maximum (different criteria for determining a clear maximum will be outlined herein below). The location of the maximum in the frequency distribution may indicate the periodicity in the event of the media stream.

Another aspect of the invention relates to the identification or clustering of media streams showing the same periodicity in a given event at the same point in time. Assuming that the periodic impairments are indicative of an impairment introduced by one or more network components in the transmission path of the media streams, it can be expected that those identified media stream are all impaired by the same root cause. The identification of media streams showing the same periodic impairment at the same point in time may be advantageously using a modulus calculated for each periodically impaired media stream, which represents the periodicity relative to a reference. By comparing the moduli calculated for the periodically impaired media streams, media streams showing a periodic impairment with the same periodicity and at the same point in time may be advantageously determined.

The identified clusters of media streams showing the same periodic event at the same point in time may be then analyzed for the root cause of the impairment. For example, the applicants recognized from experience in real life environments that impairments may be sometimes caused by periodic interruptions of packet processing functions, e.g. caused by Simple Network Management Protocol (SNMP) requests of network management systems, by endpoints creating quality reports at certain intervals or by a network component scheduling maintenance tasks in certain intervals, etc. The effect is typically visible as delay in the packet forwarding or jitter or even in a network overload pattern. The affected network component can be for example a core network element such as a media gateway (MGW) or router or a customer premises equipment (CPE) or an IP phone. Building clusters of "impaired" media streams showing a specific periodic behavior at the same time may allow identifying the affected network component (e.g. since all packets of the media streams in the cluster took a route through this network component). Identifying periodic impairments and eliminating same, e.g. by updating the firmware or even replacing the affected network component, can significantly improve the overall service quality and can increase the safety margin by reducing the amount of jitter.

It should be noted that the invention is applicable to any active or passive monitoring system that produces, preferably for given intervals and for respective monitored streams, a summary of the monitoring results within the given interval (i.e. a quality data record) that contains one or more monitoring metric based on which the presence of an event to be monitored for periodic occurrence can be identified. In the following, a more detailed implementation of the invention according to an exemplary embodiment of the invention will be described.

Generally, a communication session can be considered to consist of a media plane and a signaling plane. The media plane of the communication session is formed by media streams, while the signaling plane is formed by a signaling session. Each media stream consists of (data) packets that are sent from a source (e.g. a transmitting terminal) to a sink (e.g. receiving terminal). Please note that media streams are sometimes also referred to as packet streams in the following. The media streams convey media data, e.g. audio data—including speech data—(audio stream) or video data (video stream). Packets of the media streams are often transferred by a real-time session protocol, such as for example RTP. Typically, multiple media streams belong to a single communication session. A communication session may thus have one or more audio stream and/or one or more video stream, e.g. one media stream for each direction of a voice call (caller-to-callee and callee-to-caller).

In one embodiment, the data packets of the media streams and subjected to the monitoring are RTP packets. According to the OSI (Open System Interconnection) reference model, RTP packets are typically considered to belong to the session layer and may be transported over various transport protocols (typically UDP but other protocols such as TCP and SCTP may be used) and an IP protocol (IPv4 or IPv6) in the network layer. When monitoring the data packets of the media streams of the communication sessions, transport metrics may include information from the session layer, transport layer and the network layer.

In a typical VoIP session (often also referred to as a "call"), the media plane may for example comprise a single audio stream in each direction. A conference call may for example comprise multiple audio streams of the participants. A video conference may in turn include multiple audio streams and video streams of the participants.

Moreover, it should also be noted that during an ongoing communication session, new media streams may be added/forked (e.g. a new participant enters the conference call, an call with audio streams is "upgraded" to a video conferencing session by adding video streams, etc.) or terminated (e.g. due to codec changes, a participant of a conference call hangs up, etc.), so that the number of media streams may change over time of a session. In modern telephone networks, also ringtones are typically delivered via media streams, so there may be multiple media streams for ringtones if a call is forwarded to multiple VoIP telephone terminals, which are then terminated once the call is answered, while adding the audio stream to convey the speech data from the VoIP telephone terminal where a user answers the call.

It is possible, but not mandatory, that the packets of a media stream are isochronous, i.e. the sending source is generating packets in fixed time intervals. For instance, in VoIP calls, RTP packets are typically generated in fixed intervals, which are between 5 ms and 90 ms long. Often a packet interval of 20 ms, 30 ms or 40 ms is encountered in VoIP calls, but the invention is not limited to these values.

In the following, various exemplary embodiments of the invention will be described with respect to a passive monitoring system that is monitoring the packets of multiple media-streams of different sessions on a network link and that is processing/evaluating the received packets in real-time to conclude on a determined media stream quality of each media stream. The passive monitoring system may for example comprise one or more monitoring components (apparatuses), which could be for example a monitoring probe connected to a monitored network link through a TAP (and receives copies of the packets on the network link for evaluation) or network elements that are terminating a monitored network link, e.g. a session border controller (SBC) or a media gateway (MGW) or any network element that is protocol aware for RTP packets, so that it could act as a monitoring device.

In the following, the aspects of the invention will be exemplarily outlined with respect to a passive monitoring system, in which one or more monitoring probes monitor data packets of media streams received on respective networks links of a packet-switched network and derives transport metrics of the individual monitored packet streams, based on which the quality of the media streams can be determined. As noted above, the use of monitoring probe(s) is only exemplary, but the described functionality may also be implemented on other network equipment, e.g. a session border controller or the like. The passive monitoring system provides passive access to the monitored network traffic.

Communication sessions monitored by the passive monitoring system are communication sessions that can be for example established by the VoIP protocol suite. Since focus is on the media plane of the services, the following discussion will mainly concentrate on the media streams of the services, which may be for example transported by means of the RTP protocol. Moreover, it may be assumed that UDP is used for data transport in the transport layer (other protocols such as TCP and SCTP may also be used) and an IP protocol (IPv4 or IPv6) in the network layer.

Figure 12:
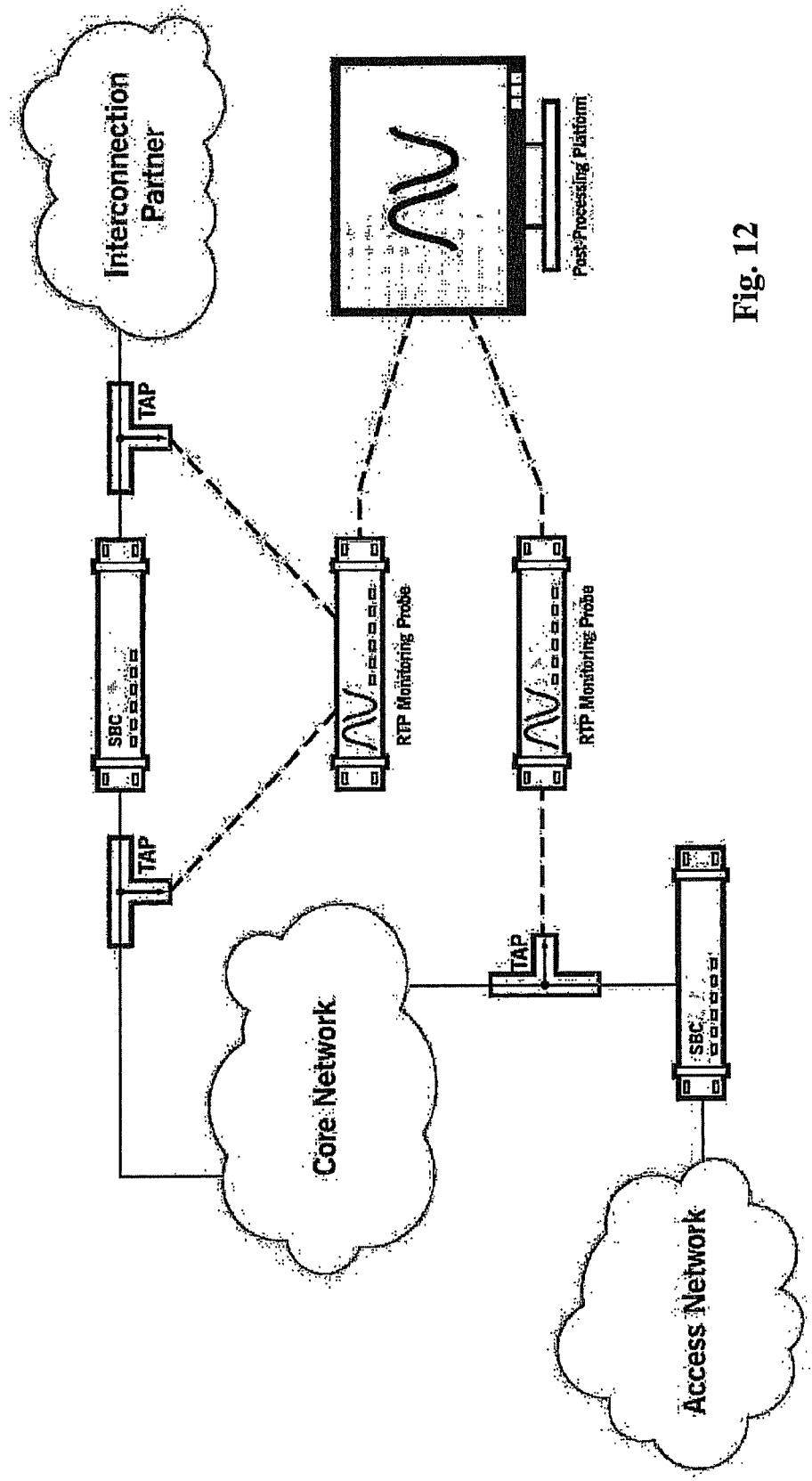
FIG. 12 shows and exemplary deployment of a passive monitoring system in a VoIP telephony service provider network.

Passive access to the IP packets of the media streams can be for example provided by installing a TAP (test access port) device into the network. The TAP device creates a copy of every IP packet it encounters on the network and offers this copy to an attached monitoring probe. FIG. 1 shows the schematic installation of a TAP in the network according to one exemplary embodiment of the invention. The TAP usually offers two network interfaces to the attached monitoring probe. The interfaces are providing separated reception and transmission traffic to the probe. Monitoring probes that are connected to a network via a TAP device are not able to inject traffic to the monitored network link. The setup can be thought of as read-only access to the IP packet streams for both directions of the communication link. The TAP may be located at different monitoring locations in the network, as exemplified in FIG. 12.

The passive monitoring system discussed herein may be capable of monitoring the signaling plane and media plane traffic of the services. For most embodiments of the invention, it is however sufficient to monitor the media plane traffic only. The passive monitoring system allows—inter alia—detecting the data packets carrying media payload, such as for example audio data (e.g. voice/speech) or video data. The media payload of the media streams is typically transported using RTP packets. Therefore, RTP packets within the IP packet stream on each link are filtered for further processing.

The monitoring probe may for example apply a special packet filter to the IP packets it is processing in order to detect those IP packets encapsulating RTP packets in their payload. The detection/filtering mechanism for RTP packets is advantageously based on the RTP definition of RFC 3550 which explains the RTP packet header in great detail. Furthermore, it is assumed for exemplary purposes that the media data is transported using the UDP protocol in the transport layer. Optionally, the detection of media packets could also consider IP packets transported via the other protocols than UDP protocol in the transport layer.

Figure 2:
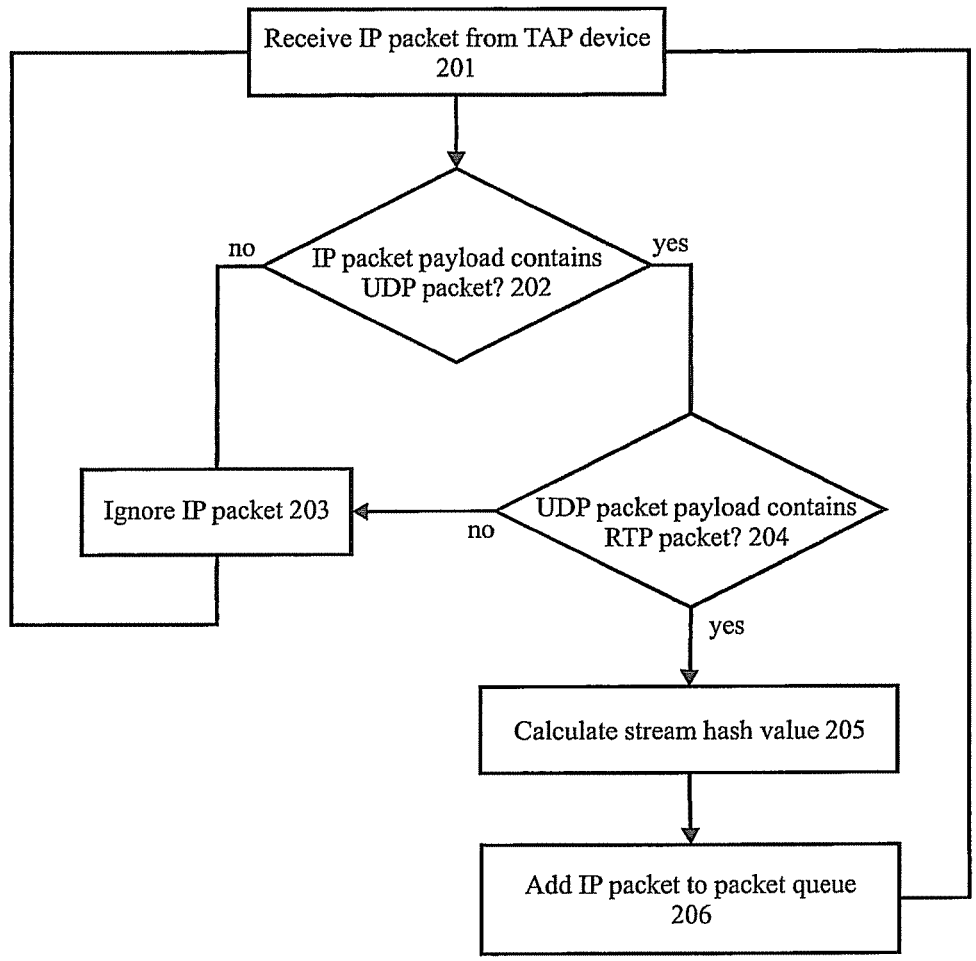
FIG. 2 shows a flow chart according to an embodiment of the invention to illustrate how a monitoring probe according to an embodiment of the invention applies a filter chain to filter and enqueue RTP packets out of the continuous stream of IP packets provided by the tapping device and prepares the filtered RTP packets for processing in the context of a media stream.

A flow chart of a detection mechanism for filtering RTP packets according to an exemplary embodiment of the invention is shown in FIG. 2. The detection mechanism ensures that the fields of the 12-byte RTP header are available and contain expected data.

For each IP packet received 201 from the TAP the monitoring probe may determine 202 first, whether the IP packet is encapsulating an UDP packet. This can be achieved for example by detecting a UDP header in the payload section of the IP packet. If the IP packet does not contain a UDP payload, then the IP packet is ignored 203 (e.g. deleted). Otherwise, it is next checked 204, whether there is an RTP header within UDP payload of the IP packet. If this is not the case, the IP packet is also ignored 203. It should be noted that this processing of the IP packets can be also easily adapted to consider other transport protocols. For example, IP packets that are carrying TCP or SCTP should be filtered in addition to or alternatively to those carrying UDP, step 202 can be adapted to also check the IP packet's payload for other headers, like TCP headers and/or SCTP headers.

Otherwise, i.e. in case it is ensured that the packet in question is really an RTP packet, a hash value may be calculated 205 over packet fields, which remains constant over the duration of the media stream. This step is however optional and may only be required in certain more sophisticated implementations, as will be explained below. The values used to calculate the stream hash may be for example:

Source-Tuple: The source tuple (source IP address and port number) is identifying the origin of the media stream and remains constant for the duration of the stream.

Destination-Tuple: The destination tuple (destination IP address and port number) is identifying the receiver of the media stream and remains constant for the duration of the stream.

SSRC: This value from the RTP header is chosen by the originator of the media stream and must remain constant for the duration of the stream.

Moreover, if the packet is routed on a specific VLAN (Virtual Local Area Network), the VLAN identifier (VLAN ID) is also considered in the calculation of the hash value, since the same IP addresses may be used on different VLANs. Moreover, if RTP packets transported via different transport protocols are to be filtered, the stream hash value may also take into account a transport protocol identifier, which identifies the transport protocol, e.g. UDP, TCP or SCTP. Similarly other tunnel protocol identifiers may be incorporated into the hash value calculation.

The above fields from any RTP packet are sufficient to be able to associate the packets to their corresponding media streams. On purpose it is referred to media streams and not to calls or communication sessions, since a call/session can have multiple media streams associated to it.

Finally, the IP packet is added 206 to a packet queue for further analysis. Another possibility would be to make use of multiple packet queues, which can be individually further processed. This may be for example advantageous in multi-core server architectures.

Figure 3:
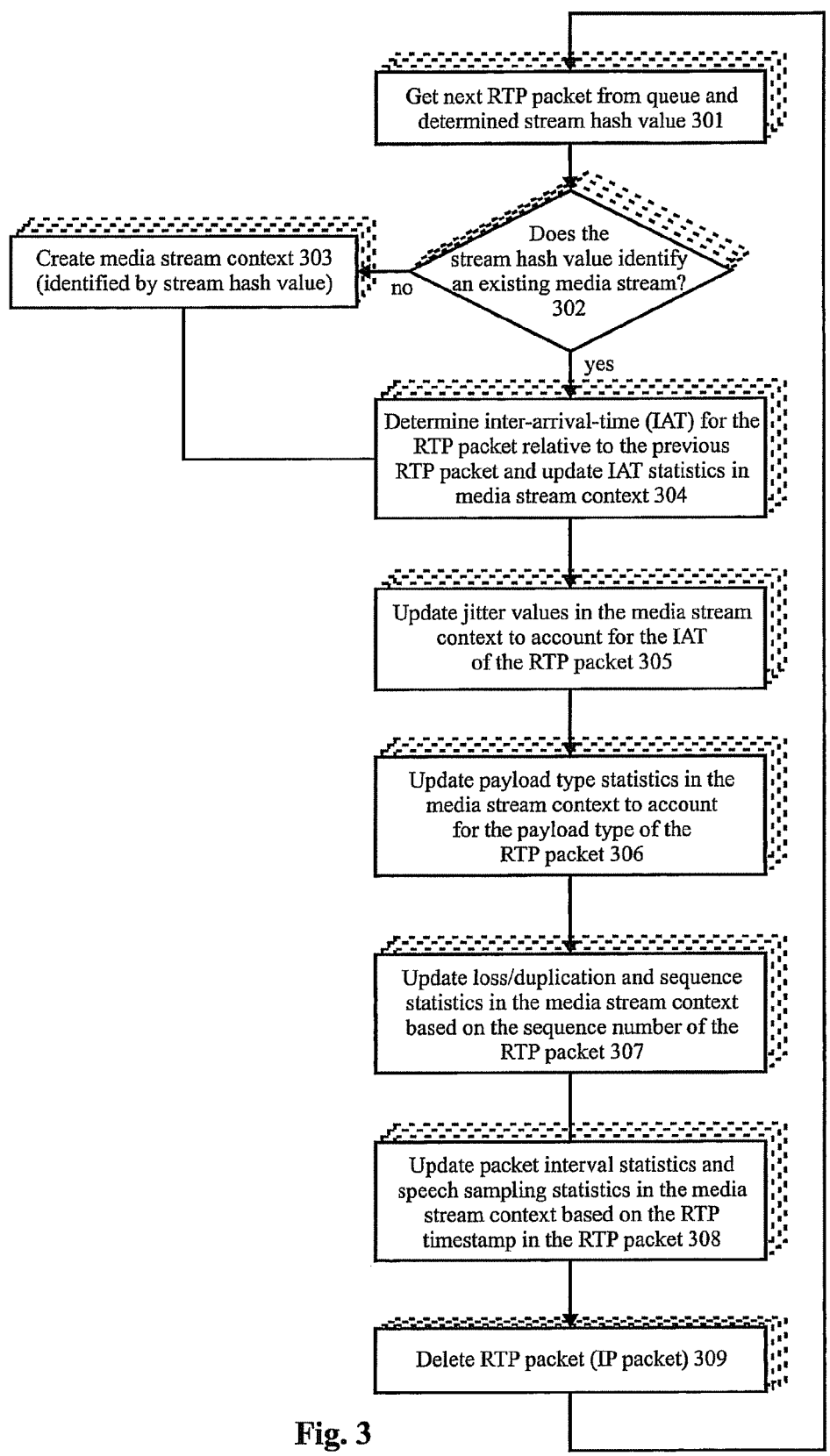
FIG. 3 shows a flow chart according to an embodiment of the invention to illustrate how received RTP packets can be associated with a media stream and can then be evaluated on their impact on transport quality in the context of preceding RTP packets of the same media stream.

IP packets of multiple media streams may be added to a single queue, as long as all IP packets belonging to a media stream are added to the same packet queue. In this latter case, each IP packet in each packet queue would need to be first associated to its media stream (context) when further processing it. This is shown in FIG. 3 part 301 and 302.

Once RTP packets have been added 206 to a packet queue, transport metrics of the media stream are determined from/updated based on the received IP packets and the media stream quality is determined for the individual streams. High processing performance can be achieved by processing the IP packets in multiple packet queues in parallel from this point on, taking full advantage of today's multi core server architectures.

According to an embodiment of the invention, processing of the RTP packets inspects each RTP packet upon arrival, and estimates its impact on quality in the context of previously received RTP packets of the same media stream. As noted above, the individual data packets can be correlated to their media stream by means of the stream hash value. After determination or updating the transport metrics of a media stream taking into account an RTP packet thereto, the RTP packet may be discarded. This allows a high number of concurrent media streams being processed in "real-time" without imposing high demands on memory utilization.

The analysis of the media stream may be considered to have two parts. During the first part of media stream analysis, all information regarding the single RTP packet is processed. This includes the determination, respectively, update of metrics of the media stream related to the transport of the RTP packets on the network. As exemplified in FIG. 3, this media stream analysis performed on the individual RTP packets of the media stream can for example include (but is not necessarily limited to):

Evaluation of the packet inter-arrival time compared to the last received RTP packet,
Determining jitter based on the inter-arrival time,
Evaluating the RTP header:
 Analyzing payload type,
 Analyzing sequence number to determine packet losses, packet duplicates and reordering events,
 Analyzing RTP timestamp to determine packet interval and speech sampling.

It should be noted again that this first analysis part can still be implemented independent of the time interval for estimating the quality of the respective media streams.

In FIG. 3 (and the other figures) the broken rectangles are intended to indicate that the media stream analysis can be performed for individual media streams in parallel, e.g. in a multi-core architecture in the monitoring probe allows to do so. Generally, the IP packets which are found to contain a RTP packet by the filtering mechanism outlined with respect to FIG. 2 are denoted RTP packets in FIG. 3 for simplicity. However, it should be understood that not only the RTP packets but also the IP header and UDP (or any other transport protocol) header information of the IP packet, respectively UDP packet encapsulating the RTP packet may be available for processing.

The media stream context of a respective media stream (identified by a respective stream hash value as outlined above) may also be considered to comprise a packet queue in which the RTP packets of the media stream are buffered for further processing. Accordingly, the monitoring probe receives 301 a next RTP packet from a packet queue and calculates the stream hash value for the RTP packet. The stream hash value may be calculated for the RTP packet as exemplified above. Before the mechanism shown in FIG. 3 determines and updates transport metrics of the media stream based on the individual RTP packets, it is first checked 302 whether there already exists a media stream context which is associated to the stream hash value of the currently processed RTP packet. If there is no media stream context (i.e. there has been no RTP packet of this media stream processed before), the media stream context is created 303, before steps 304 to 308 are performed Subsequently the RTP packet is processed according to steps 304 to 308. It should be noted that it is not necessary to perform all of steps 304 to 308. Furthermore, it is also possible that the steps 304 to 308 are performed in another order. In principle, steps 304 to 308 determine and update transport metrics of the media stream based on the individual RTP packets, based on which a transport quality or a media quality can be determined in the second part of the analysis of the media stream, as outlined below.

In the example shown in FIG. 3, the monitoring probe exemplarily determines 304 the inter-arrival time (IAT) of the RTP packet relative to the previously processed RTP packet and stores this IAT in the media stream context, e.g. by updating an IAT histogram according to the determined IAT for the RTP packet. For this purpose, each RTP packet may be assigned a timestamp (not shown in FIG. 2) that indicates the time of arrival in the monitoring probe. For this purpose, the timestamp of the previously processed RTP packet may be temporarily maintained (even after deleting the previous RTP packet—see step 309).

Further, the monitoring probe can determine and update 305 information on the jitter of the IATs of RTP packets of the given media stream based on the IAT determined in step 304. Moreover, the monitoring probe may further analyze 306 the payload type and may record changes of the payload type indicated in the RTP header of the RTP packets and/or may update a corresponding statistic.

Further, another transport metric(s) that is/are determined 307 by the monitoring probe are loss information. For example, by comparing the sequence number of the currently processed RTP packet to the sequence number of the previous RTP packet (this information being temporarily maintained for this purpose in the monitoring probe), packet loss can be determined. Moreover, the sequence number of the currently processed RTP packet can also be compared to sequence numbers of previous RTP packets (this information being temporarily maintained for this purpose in the monitoring probe), in order to detect reordering of the packets, packet duplicates, packets losses, etc.

In a further step 308, the RTP timestamp of the RTP packet is analyzed to determine packet interval and speech sampling. This information is also added/updated in the media stream context accordingly.

After having extracted transport related metrics from the RTP packet, as exemplified in steps 304 to 308 above, the RTP packet can be deleted 309 and the subsequent analysis is performed based on the extracted transport related metrics. This way, the amount of data that needs to be stored in memory of the monitoring probe is significantly reduced, as only a "summary" on the transport metrics needs to be maintained for further processing.

The second part of the analysis of the media stream will be done for predetermined time intervals. This ensures that quality information (and especially, impairment information, which are of particular interest) is available in a high granularity for every media stream of a call. The media stream quality is determined for predetermined time segments (or intervals).

The duration of these predetermined time intervals or segments may be configured by the user via some configuration software interface. In one example, the segments or time intervals for which the media quality is determined is in the order of a few seconds, e.g. 5 seconds. I.e. taking the example of 5 seconds, the media stream quality of each media stream is determined based on the media stream's data packets received at the monitoring probe within a given 5 second interval.

Segments of 5 seconds may be advantageous as this time interval provides a compromise between system utilization and in-call quality determination. For VoIP services, the packet intervals (i.e. the intervals in which the media encoder (generate media payload, which is ideally the interval in which the devices of the participants inject IP packets including the media payload on the network) are typically between 5 ms and 90 ms. This means that over a 5 second time interval media stream analysis would have to process between 1000 and 56 packets per 5 second interval.

Generally, it is also possible to select another interval than 5 seconds, e.g. in the range [3 seconds; 30 seconds]. The selection of the proper predetermined time interval may for example be dependent on the media type of the monitored media streams. As noted above, a time interval of 5 seconds may be particularly suitable for monitoring voice connections, while for video (e.g. MPEG video streams, where I-frames may be sent up to 30 seconds apart from each other), the predefined time interval may be in the multiple 10 seconds range.

The configured time interval should ensure that all data packets arriving within the configured time interval can be processed within the same period of time, so that—advantageously—only data packets of the time interval currently evaluated/processed and the arriving data packets of the next time interval have to be buffered.

Figure 4A:
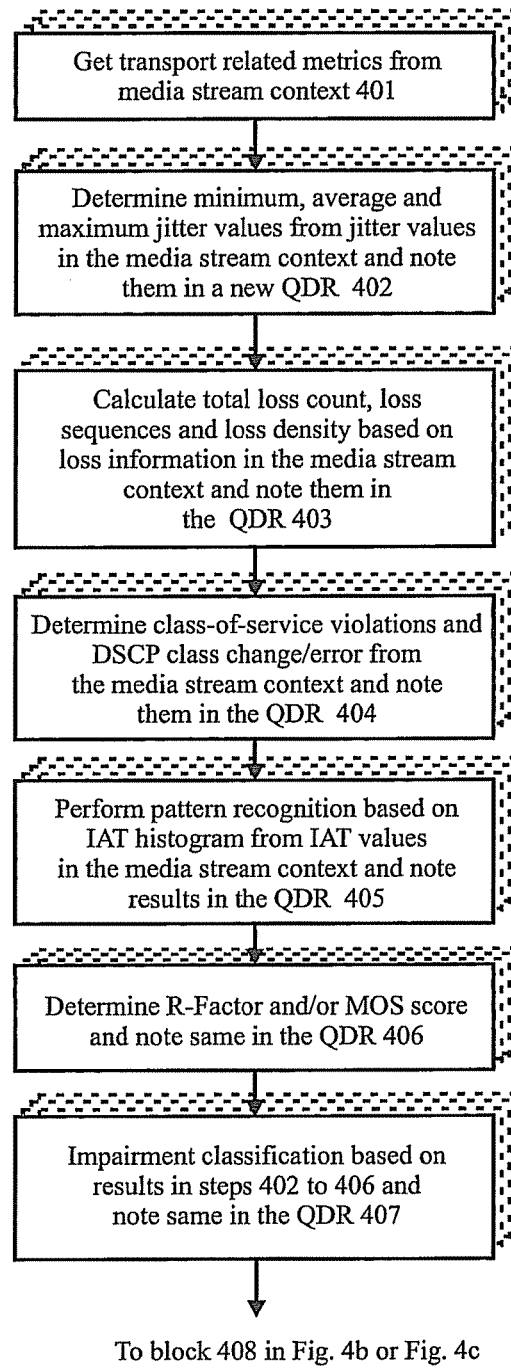
FIG. 4A shows a flow chart according to an embodiment of the invention to illustrate how in predetermined time intervals, transport metrics collected from individual RTP packets, stored in the media stream context, are evaluated in the context of the media stream to create a quality data record for the passed predetermined time interval indicating if the quality is above or below predetermined thresholds.
Figure 4B:
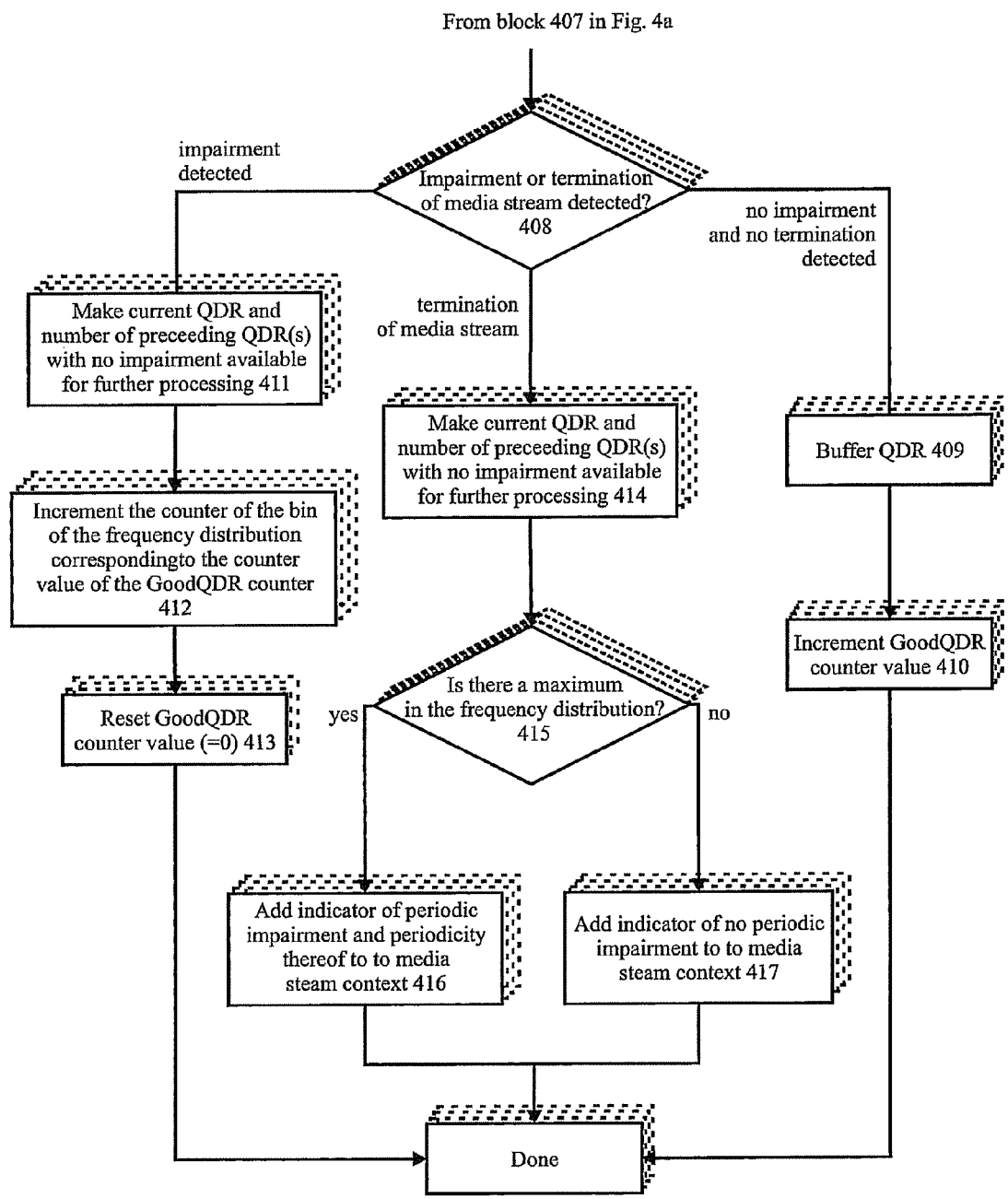
FIGS. 4B & 4C shows a flow chart according to different embodiments of the invention to illustrate how individual quality data records created for predetermined time intervals can be processed for detecting periodic impairment of media streams.
Figure 4C:
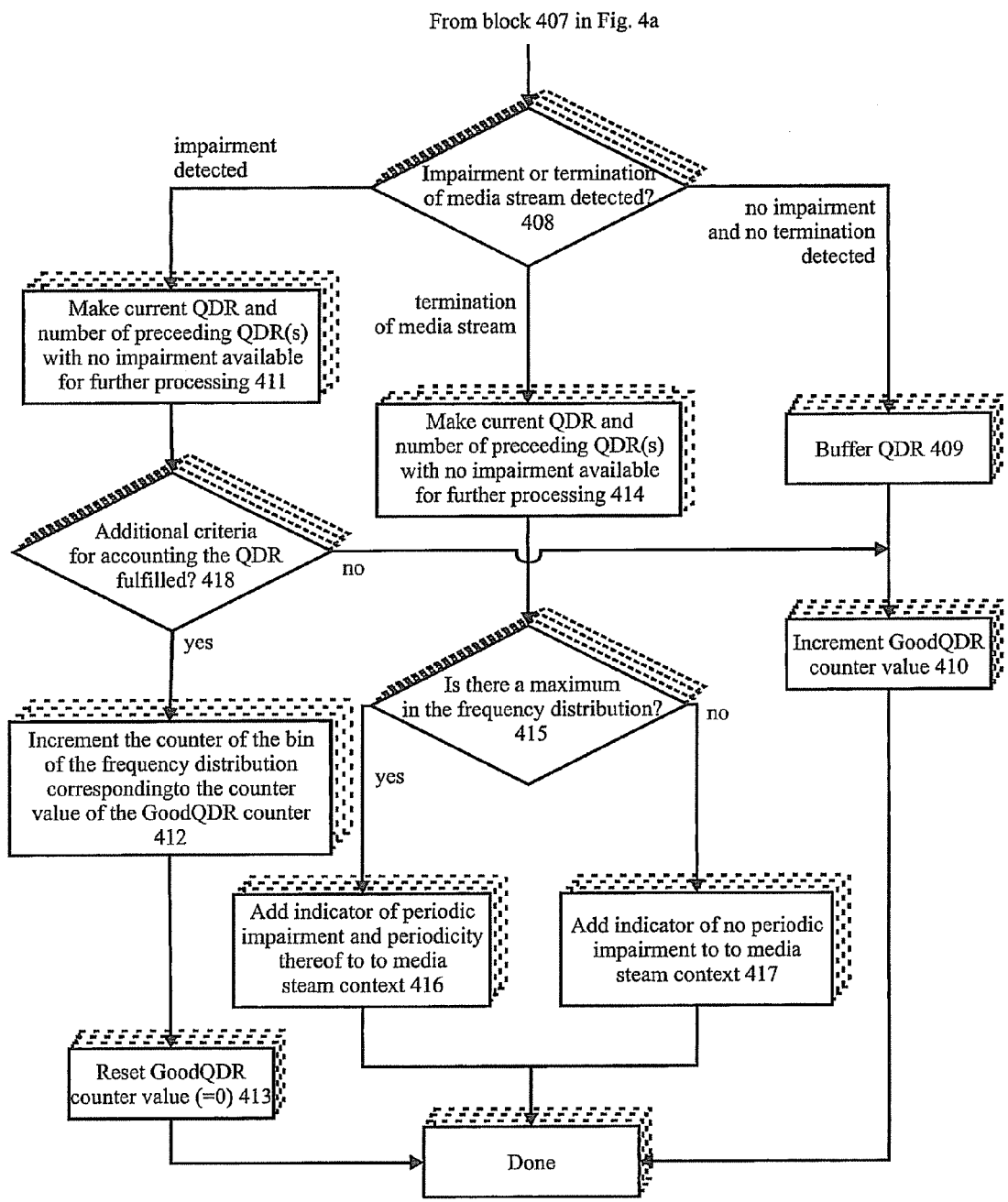

FIGS. 4A to 4C show flow charts of the second part of the analysis of the media stream according to exemplary embodiments of the invention. In the considered embodiment of the invention the predetermined time interval will be applied to all currently processed streams at the same time. This way (periodic and non-periodic) impairments affecting more than one media stream at the same time can be detected. For this purpose, the predetermined time intervals are advantageously aligned by means of a wall-clock, and not to the timestamp of the first RTP packet of a respective media stream. In case the monitoring probe has a multi-core processing architecture, it may be advantageous to distribute currently active media streams evenly on all available CPU cores of the target hardware.

The second part of the analysis of the media stream can be considered to provide a further evaluation and/or summary of the transport metrics that are available in the media stream context for a given predetermined time interval. This analysis also includes an estimation of the quality of the media stream within the predetermined time interval, which can be either a transport quality or a media quality. The transport quality of the media stream within a predetermined time interval may be for example expressed by minimum, average and maximum values for jitter, packet loss, packet loss length, inter-arrival times, discarded packets and the like, covering the full length of the predetermined time interval. Considering all the aforementioned transport quality metrics, the media quality can be determined to reflect the estimate speech quality of a media stream up to this point in time. In one exemplary implementation, the media quality is determined by calculating the R-factor and/or the MOS score for media stream or a user experience quality for the respective predetermined time interval based on the transport metrics in the media stream context.

In one exemplary implementation according to an embodiment of the invention, at least one of the following performance indicators is determined for each media stream and for each predetermined time interval from the transport metrics of the respective media stream:

Packet interval
Minimum, average and maximum jitter values
Characteristics of packet loss
Total packet loss
Packet sequence violations
DSCP class violations
Pattern recognition based on packet inter-arrival time distribution
Classification of sender and network related impairments
Determining an R-factor and MOS score
Determining overall user experience quality
Determining overall transport quality The performance indicator(s) generated in the second part of the analysis may be stored by the monitoring probe together with the packet level information of the first part of the analysis, in a record, which is also referred to as a quality data record (QDR).

The exemplary flow chart shown in FIG. 4A is performed on all active media streams monitored by the monitoring probe for every predetermined time interval, e.g. every 5 seconds. Once the process is triggered, the monitoring probe obtains 401 the transport related metrics of the respective media stream from its media stream context. The transport metrics obtained from the media stream context relate to the evaluation of the RTP packets that have been received in the last predetermined time interval, e.g. the last 5 seconds.

Based on the obtained quality metrics, the monitoring probe determines performance indicators, which allow estimating the media stream quality in terms of its transport quality and/or its media quality. Again, not all steps 402 to 407 are necessarily performed, except those steps needed to determine the media stream quality in terms of calculating an R-factor or MOS score. Similarly, it is also possible to perform some or all of steps 402 to 407 in an arbitrary order.

In step 402 the minimum, average and maximum jitter of the RTP packets (see step 305 of FIG. 3) received within the within the last predetermined time interval, e.g. the last 5 seconds, are added to a quality data record (QDR) for the last predetermined time interval. Moreover, the number of lost packet (loss count) in the last predetermined time interval, the maximum number of packets lost in a sequence and a loss density may also be determined 403 by the monitoring probe based on the transport metrics obtained from the media stream context, as well as the estimated number of discarded packets which are caused due to high jitter values. Also this information may be added to the QDR.

Further, it may be determined 404 if there has been and/or how many class-of-service violations occurred in the last predetermined time interval and/or if and/or how many DSCP class changes or errors occurred within the last predetermined time interval. Again, this information may be noted in the QDR. Moreover, based on an IAT histogram of the RTP packets received within the last predetermined time interval, a pattern recognition may be performed 405 by the monitoring probe, which allows the identification of certain error causes in the network and media source of the media stream. Error causes detected in this fashion may also be noted in the QDR.

Furthermore, the transport metrics available on the RTP packets received within the past predetermined time interval may be further used to calculate 406 an R-factor and/or a MOS score for the past predetermined time interval of the media stream. The R-factor and MOS score may be considered indicative of the media quality, respectively, the speech quality.

Moreover, the monitoring probe may also classify 407 the QDR based on the evaluation results of steps 402 to 406. This classification basically identifies the QDR to indicate a monitored event, respectively, impairment of the media stream in the last predetermined time interval or not. As shown in FIG. 4B, classification may be further used to decide in step 408, how the generated QDR should be further processed. Please note that for simplicity it is assumed that step 408 only checks whether a specific event which should be detected is indicated by the respective current QDR. In the example shown in FIG. 4B, the classification of the QDR is checked for whether the classification yields an impaired QDR or not.

In case it is judged 408 that the current QDR is indicating no impairment of the media stream, the QDR may be buffered 409 for a predetermined amount of time. For example, the QDR referring to the last couple of minutes (e.g. up to 10 minutes, 15 minutes, 20 minutes, or the like) may be buffered, if no impairment was detected in the monitored media stream. The buffered QDRs may also be combined with each other so as to refer to longer time periods in multiples of said predetermined time interval in order to save storage space. In order to indicate the period in time to which the combined QDR refers to, same may further include a timestamp indicative of the start of the first predetermined time interval to which the combined QDR refers to and a timestamp indicative of the end of the last predetermined time interval to which the combined QDR refers to. In case of a QDR indicating impairment, the first predetermined time interval and last predetermined interval are the same interval; i.e. only when QDRs yielding no impairment are aggregated/combined, these time intervals are different from each other.

Furthermore, to enable the detection of the monitored impairment to be periodic or not, a counter (GoodQDR counter) is incremented to track the number of good QDRs (i.e. those QDRs not showing the tracked impairment), since the last impaired QDR (i.e. the last QDR showing the tracked impairment).

In case the current QDR has been judged 408 to yield an impairment of the media stream within the associated predetermined time interval (i.e. the next impaired QDR showing the specific impairment which should be detected is detected), any buffered QDRs yielding no impairment (see step 409) and optionally the current QDR (e.g. if not empty) are made available 410 for further processing. Furthermore, the number of consecutive good QDRs since the last impaired QDR is accounted for in a frequency distribution for the given media stream. This is accomplished by incrementing 412 a counter of a bin in the frequency distribution that is corresponding to the number of successive good QDRs as indicated by the GoodQDR counter value. After incrementing the counter for the bin in the frequency distribution, the GoodQDR counter value is reset 413 to zero. This latter step makes the current impaired QDR the new reference QDR relative to which the number of consecutive good QDRs is counted. Notably, the mechanism to track the number of successive good QDRs in between two successive impaired QDRs and the accounting for the number of successive good QDRs in the frequency distribution may be implemented by simply incrementing respective counters, which is a simple operation allowing for tracking the number of successive good QDRs in between two successive impaired QDRs with low computational effort, and thus in a real-time implementable way. While the media stream is active (e.g. the VoIP call is not terminated) the frequency distribution is "filled" by incrementing respective counters of the bins thereof, each bin corresponding to a given number of successive good QDRs in between two (successive) impaired QDRs.

FIG. 4C shows another, more flexible implementation of the steps outlined with respect to FIG. 4B. In addition to the classification check in step 408, there may be further additional criteria checked 418 in the method deciding, when to account for the impaired QDR (in terms of its classification). Only if these additional criteria are met, the counter of the respective bin in the frequency distribution that is corresponding to the number of successive good QDRs as indicated by the GoodQDR counter value is incremented 412. Otherwise, the GoodQDR counter value is incremented 410. In the latter case, the reference impaired QDR relative to which the number of successive good QDRs is counted is not changed—the current impaired QDR is thus ignored and counted as a good QDR and is further not taken as a new reference impaired QDR. Furthermore, it should be noted that in this implementation the GoodQDR counter value is a specific count of "good" QDRs including good QDRs (not impaired according to classification) and ignored impaired QDRs (according to classification). The GoodQDR counter value is thus different from that in FIG. 4B, which is counting the consecutive good QDRs (according to classification), and used only for deciding the counter of which bin in the frequency distribution needs to be incremented. A counter for the number of consecutive good QDRs as provided in FIG. 4B may be implemented in addition to the GoodQDR counter of FIG. 4C, and may be included in the media stream context.

The mechanism implemented by step 418 may be for example used to track specific events other than the classification of QDRs. For example, the check in step 418 may be used to assure that only QDRs are accounted in the frequency distribution that show a specific event, e.g. exceed a threshold value for packet loss and/or jitter.

The mechanism implemented by step 418 may also allow controlling, e.g. the range of periodicities of events that can be tracked. In general, it can be assumed that periodic events and purely random events are super-positioned in the monitored media streams, and it is therefore desirable to safeguard the tracking of periodic events from being disturbed by purely random events or hidden by events of higher periodicity, which can be ensured by defining additional criteria checked in step 418. For example, as will be outlined below in further detail, it may be desirable to account only the number of successive good QDRs (e.g. at least 2, 3 or more good QDRs) in between a pair of impaired QDRs is there are at least a threshold number of successive good QDRs in between them. This allows controlling the lowest periodicity tracked and can reduce the number of false positives in the frequency distribution.

Furthermore, it may also be desirable to have an upper limit of the searched periodicities. The reason for this may be as simple as memory saving, since the tracking of events for thousands of concurrent media streams may require relevant amounts of memory. It should be understood that in view of the QDRs pertaining to predefined intervals of a given duration, the number of successive good QDRs is equivalent to the spacing in time in between two occurrences of an event, and thus potentially indicative of the periodicity of the event (expressed in seconds).

In case it is determined in step 408 that the media stream has terminated, the current QDR is output 414 together with any buffered QDRs yielding no impairment (see step 409), if present. Notably, steps 415, 416 and 416 could also be implemented in another component of the passive monitoring system other than the monitoring probe, e.g. a post processing platform that has access to the QDRs generated for the respective media stream. Furthermore, steps 415, 416 and 416 are not time-critical, i.e. real-time processing is not mandatory for these steps. Nonetheless, the implementations of steps 415, 416 and 416 shown in FIGS. 4B and 4C also allow for real-time implementation, since they can be implemented with low computational complexity, as will become more apparent from the following.

With respect to the detection of a media stream being terminated, in one exemplary implementation not shown in FIG. 4A, there may be a further evaluation in between steps 401 and 402, that determines based on the transport metrics whether any RTP packets for the media stream have been received in the past predetermined time interval, e.g. the last 5 seconds. The termination of a media stream could be for example indicated by a termination flag set in the media stream context. If it is determined for a threshold number of times (e.g. 1, 2, 3, 4 or 5) in a row that no RTP packets for the media stream have been received in the respective past predetermined time interval, the media stream may be judged to be terminated and the process may directly jump to step 408. In this case, step 414 outputs only buffered QDRs yielding no impairment (see step 409), if those are present.

Besides providing any buffered and non-buffered QDRs for the stream for further processing, the monitoring probe further analyzes the frequency distribution that has been filled using one of the above noted procedures of FIG. 4B and FIG. 4C. Please note that the processing upon termination of a media stream is the same in FIGS. 4B and 4C. The monitoring probe checks 415 the frequency distribution for a clear maximum in one of the bins of the frequency distribution. In other words, this step checks whether a certain periodicity (i.e. certain number of successive good QDRs) in between two (successive) reference QDRs) predominantly occurred. For example, this check 415 may determine, whether there is a single maximum in the frequency distribution and if so, whether the bin of the single maximum contains at least 50% of the distance measures that have been accounted for in the frequency distribution.

Furthermore, there may be additional criteria checked in step 415. For example, another criterion checked may be whether the ratio between the number of impaired QDRs in the media stream and the total number of QDRs generated for the media stream (this may be for example tracked by a QDR counter incremented each time a QDR is generated for the media stream)—a so-called impairment ratio—is lower than a threshold percentage, e.g. 33%, 25% or lower. This criterion may for example be useful to exclude media streams suffering from bursty impairments from being considered periodically impaired.

In this connection, another optional criterion may be a minimum number of entries in the bins of the frequency distribution. For example, the frequency distribution can be considered to yield any periodicity of an event only, if there are at least two entries in a bin of the frequency distribution. Please note that also in the ideal case where the media stream only shows periodic events, the number of "entries" in the frequency distribution will depend on the periodicity of the event and the duration of a session. If the session is only 1 minute long, and the periodicity of an event is more than 1 minute, no periodic event can be detected for the given media stream. But also in case the periodicity of the event is 30 seconds, there would only be at best two "entries" in the bin corresponding to 30 seconds (i.e. the bin for 6 (consecutive) good QDRs, when assuming a QDR to relate to a 5 second interval of the media stream). Therefore, as noted above, another criterion that may be checked in step 415 may be whether there are a minimum number of entries in one of the bins of the frequency distribution, where the minimum number may be predefined or depending on the duration of the media session.

Only if the one or more criteria checked in step 415 are all fulfilled, the media stream is considered "periodically impaired", i.e. a given event is occurring periodically in the media stream. Accordingly, the monitoring probe may set 416 a corresponding indication in the media stream's context. Further, monitoring probe may also include the periodicity of the event (e.g. in terms of the number of (consecutive) good QDRs corresponding to the bin in the frequency distribution showing the maximum or this number converted into the time domain by multiplying it with the duration of the predefined interval to which the QDRs refer).

Furthermore, in another embodiment, the monitoring probe or another network component may also calculate a modulus based on the periodicity of the monitored event of each respective monitored media stream. This modulus may be added to the media stream's context along with other information as noted above. In one exemplary implementation, the modulus for a media stream is calculated by performing a modulo division (a mod m) of the start time of an arbitrary QDR of the media stream showing the tracked event/impairment (a) by the periodicity of the monitored event in the media stream (m). The modulus denotes the remainder of the modulo division $$\left(\text{i.e. } a \bmod m \equiv a - \left\lfloor \frac{a}{m} \right\rfloor \cdot m, \text{ where } \left\lfloor \frac{a}{m} \right\rfloor\right)$$

denotes the floor function providing the largest integer not greater than the quotient $$\frac{a}{m};$$

-continued
e.g.

$$17 \bmod 3 = 17 - \left\lfloor \frac{17}{3} \right\rfloor \cdot 3 = 17 - 5 \cdot 3 = 2$$

The start time of the QDR is denoting the point in time of a day expressed in seconds from midnight (0:00 AM) corresponding to the start of the media stream that started within the predetermined time interval, to which the QDR refers. The periodicity is also expressed in seconds. It should be apparent that as an alternative to the start time of the QDR, also the end time of the QDR (denoting the point in time of a day expressed in seconds from midnight (0:00 am) corresponding to the end of the predetermined time interval of the media stream, to which the QDR refers) could be used for the modulus calculation or any fixed offset relative to the start or end of the QDR.

Notably, in the implementation of FIG. 4C it may be assumed that such criteria defining the event do also lead to a general classification of the QDRs as impaired QDRs in step 407 of FIG. 4A. If this should not be the case, but also as a true alternative, the steps for tracking periodic events of FIGS. 4B and 4C (i.e. steps 410, 412, 413, 415, 416, 417 and 418) could be implemented in parallel process to the "conventional" processing of QDRs based on their classification (steps 408, 409, 411, and 414). In this case, similar to step 408, there may be an initial step that tracks specific events, such as described for step 418 above, and which discriminates impaired QDRs (a QDR showing the tracked event) and good QDRs (a QDR not showing the tracked event) or the termination of the media stream, which branches to steps 412 and 413 (impaired QDR) or step 410 (good QDR) or steps 415, 416 and 416 (termination), respectively.

In one embodiment of the invention, the monitoring probe may further generate and output a media stream summary record in configurable summary intervals (e.g. 10 minutes, 15 minutes, 20 minutes, or the like) and, respectively, or where the media stream is terminated before the expiry of this interval, upon termination of the media stream. The media stream summary reports may contain at least a part of the media stream context information, including the periodic impairment indication, and where implemented, also the periodicity of the periodic event and/or the modulus of the periodic event. The media stream summary reports thus either contain information on the media stream for the respective corresponding summary interval, respectively, the period from a previous media stream summary report/ beginning of the media stream to the termination of the media stream. The media stream summary reports for the respective media streams are stored in a database along with the QDRs of the media stream. The stored information in the database may be for example accessed for analysis from a post processing platform.

As noted above, the modulus calculated for a periodic event of a media stream can be used to find other media streams in which the event occurred at the same point in time and with the same periodicity. All media streams showing this property will have the same modulus.

According to a further aspect of the invention, the media streams in which the event occurred at the same point in time and with the same periodicity can be identified in a correlation component (e.g. the monitoring probe or another network component) by searching and identifying the media streams showing the event and having the same modulus. This may be for example done by the monitoring probe searching for the same modulus in the media stream contexts of the media streams the data sets of which are available at the correlation component. The monitoring probe may store a correlation record indicating identifying the media streams affected by an event at the same point in time and periodicity in a database for later use in a post processing platform. Alternatively, another component, e.g. a post processing platform, could access the media stream summary reports of the monitored media streams of one or more monitoring probes stored in a database and my identify media streams showing the same event at the same point in time and with the same periodicity. The results of such correlation may be for example provided to an administrator of the monitored network by means of a network management application on the post processing platform or a message (e.g. an email).

In the following, some further exemplary modifications of the methods for detecting periodic events in the monitored media streams according to different embodiments of the invention will be discussed.

As outlined above, step 418 of FIG. 4C could be used to ignore long sequences of good QDRs exceeding a configurable "maximum" periodicity (equivalent to a maximum gap between impaired QDRs). In an alternative implementation, long sequences of good QDRs are not ignored, but also accounted in the frequency distribution. For example, the bin of the frequency distribution the counter of which is to be incremented could be calculated by dividing the number of (consecutive) good QDRs modulo the "maximum" periodicity (i.e. the maximum gap in terms of an equivalent number of QDRs).

Furthermore, different implementations may be possible how to select the reference QDR relative to which the number of (consecutive) good QDRs is determined. As described above the reference QDR may only moved once a sufficiently long sequence of good segments has been processed (e.g. discussed in relation with FIG. 4C). An alternative implementation could set the reference QDR to be the last impaired QDR before a sufficiently long sequence of good segments (e.g. discussed in relation with FIG. 4B).

In one exemplary implementation, the passive monitoring system could distinguish good, tolerable and critical segment/QDR qualities and a QDR is considered impaired, if it is for example not good, or in an alternative implementation, if it is critical. Of course more impairment levels could be used. With respect to periodic impairment detection such differentiated quality levels could also be used to run the algorithm separately for different quality levels. This could be helpful if one assumes that periodic impairments are likely of the same severity.

Moreover, it should be noted that there are other alternatives for creating the frequency distribution of the encountered numbers of (consecutive) good QDRs, e.g. in case periodic stream detection does not need to be done on-the-fly. If the media stream's QDRs are available for analysis (e.g. in a database), then the sequence of the QDRs may also be analyzed in the frequency domain. For this purpose, the analysis platform (e.g. the post processing platform) could perform a Fourier transformation (or an equivalent transformation into the frequency domain) on the sequence of the QDRs which would indicate the dominant period, if any.

Next, some exemplary scenarios of impaired media streams are discussed and it is outlined in more detail, how periodic impairment is or is not detected in these exemplary media streams using the method described in connection with FIG. 4C, where it is assumed for simplicity that the monitored event is a certain quality of the media stream segment as indicated the QDRs' classification and further that there should be at least two consecutive good QDRs between two impaired QDRs. Please note that in the examples shown in FIGS. 5 to 10 below, the distance between the reference QDR and the next impaired QDR (having at minimum of two consecutive good QDRs in between the reference QDR and the respective impaired QDR) is accounted for in the frequency distribution. This is in principle equivalent, except for the distance being equivalent to the GoodQDR counter of FIG. 4C plus one. Accordingly the periodicity expressed in time is (distance-1) times the duration of the predetermined time interval.

Figure 5:
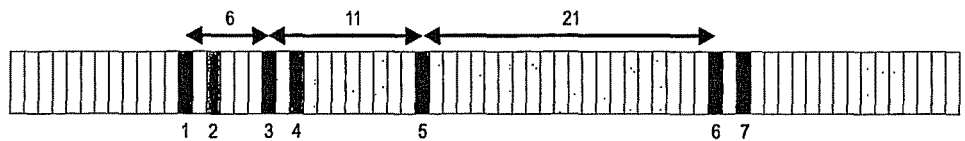
FIG. 5 shows an exemplary, randomly impaired media stream.

First, an exemplary pattern of a randomly impaired media stream is considered as exemplarily shown in FIG. 5. FIG. 5 shows a media stream with tolerably impaired fixed time slices (QDRs) that occur randomly at different times of the media stream. The dark-colored rectangles are intended to show impaired QDRs, while the light-colored rectangles indicate QDRs showing no impairment. FIG. 5 may be considered to show a typical packet stream of a VoIP call.

The following sketches the process of establishing a frequency distribution of consecutive good segments for the example media stream of FIG. 5 using the method outline with respect to FIG. 4C. Based on this the algorithm will process the above stream as follows:

1. An impaired QDR (1) has been detected. It becomes the starting point for the periodic impairment detection (reference QDR).
2. The next impaired QDR (2) is only a single good QDR away, i.e. there is no minimum length gap between the impaired QDRs (1) and (2) (i.e. there are not at least two good QDRs between the two impaired QDRs). Therefore this QDR is not considered, and the starting point of the impairment detection remains QDR (1).
3. Then QDR (3) is found to be impaired, and the gap relative to QDR (1) is more than two good QDRs. Therefore QDR (3) is considered for the periodic impairment detection. The distance from QDR (3) to QDR (1) is (Index$_{QDR3}$–Index$_{QDR1}$=distance=6$_{QDR}$) is 6. The counter for bin 6 is incremented accordingly and the starting point is moved from QDR (1) to QDR (3), i.e. QDR (3) becomes the new reference QDR.
4. The gap between QDR (3) and the next impaired QDR (4) is not sufficiently large and thus impaired QDR (4) is ignored.
5. QDR (5) is the next impaired QDR and is found to have a sufficient number of unimpaired QDR in between QDR (3) and QDR (5). Therefore the distance is again determined: (Index$_{QDR5}$–Index$_{QDR3}$=Distance=11$_{QDR}$) the result is 11. The counter for bin 11 is incremented accordingly and the starting point is moved from QDR (3) to QDR (5).
6. The next impaired QDR in sequence is QDR (6) and it is considered as it qualifies due to a sufficient gap of unimpaired QDRs. The distance is 21. Therefore the counter in bin 21 is incremented accordingly and the starting point is moved from QDR (5) to QDR (6).
7. The last impaired QDR is QDR (7) but it is not considered due to insufficient number of good QDRs to reference QDR (7).

Figure 6:
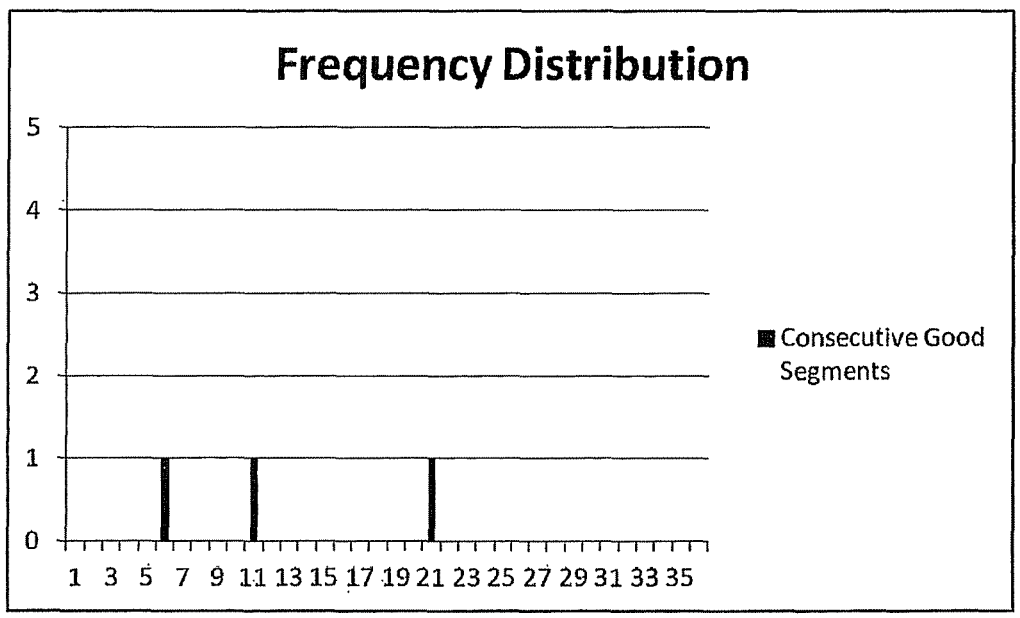
FIG. 6 shows a frequency distribution of the number of (consecutive) good quality data records in between two (successive) impaired quality data records for the randomly impaired media stream of FIG. 5.

From the analysis above, bins 6, 11 and 21 in the frequency distribution have been incremented as shown in FIG. 6. As apparent from FIG. 6 there is no maximum in the frequency distribution that would yield the periodic occurrence of an impaired QDR every so-and-so many QDRs. Therefore, it can be assumed that the distribution of impairments is of rather random nature. This media stream is thus found not affected by a periodic impairment.

Figure 7:
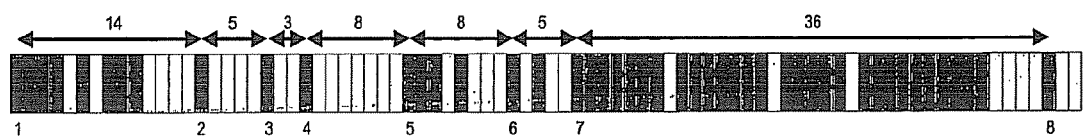
FIG. 7 shows an exemplary, heavily impaired media stream.

Next, it will be considered how the procedure of FIG. 4C above will operate on a heavily impaired stream, as exemplarily shown in FIG. 7. The dark-colored rectangles are again intended to show impaired QDRs, while the light-colored rectangles indicate QDRs showing no impairment. Again only those segments will be considered in forming the frequency distribution that have at least two unimpaired QDR in between impaired QDRs:

8. Already the first QDR (1) is impaired and becomes the starting point of the periodic impairment detection (reference QDR).
9. Up until QDR (2) is found either only impaired QDR have been detected, or the gap of good QDR was insufficient. For impaired QDR (2), the distance to reference QDR (1) is determined to be 14. The value of bin 14 is incremented and the starting point for the periodic impairment detection is moved to QDR (2).
10. The next impaired QDR is QDR (3). It is considered because the good QDR gap is more than two good QDRs. The determined distance of QDR (3) to reference QDR (2) is 5. The value of bin 5 is incremented and the new reference QDR becomes QDR (3).
11. The next impaired QDR (4) also qualifies for being accounted in the frequency distribution. The distance of QDR (4) relative to QDR (3) is 3, so that the value of bin 3 in the frequency distribution is incremented. The new reference QDR becomes QDR (4).
12. QDR (5) is the next impaired QDR and qualifies for accounting in the frequency distribution. The gap to QDR (4) is determined to be 8, so that the value of bin 8 in the frequency distribution is incremented, and the new reference QDR becomes QDR (5).
13. QDR (6) is the next QDR qualifying for accounting in the frequency distribution with a sufficient gap of good QDRs. Again the distance to the reference QDR (5) is determined to be 8. The value of bin 8 in the frequency distribution is incremented again and the starting point is moved to QDR (6) as the new reference QDR.
14. QDR (7) is the next impaired QDR that shows a gap of more than two good QDR. The distance determined is 5. The value of bin 5 is incremented and the starting point is moved to this QDR (7) as the new reference QDR.
15. The last matching candidate is QDR (8). The determined distance is 36 so that the value of bin 36 is incremented.

Figure 8:
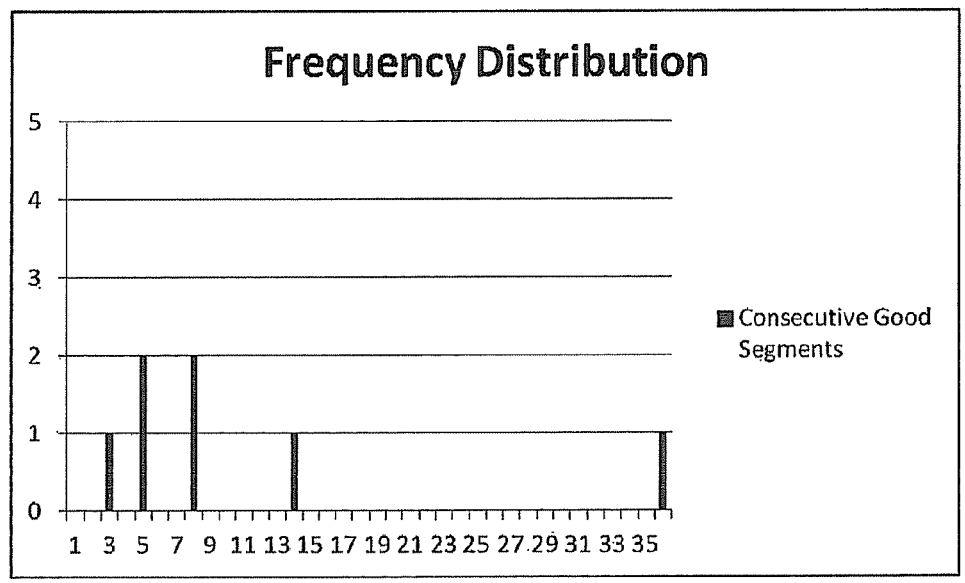
FIG. 8 shows a frequency distribution of the number of (consecutive) good quality data records in between two (successive) impaired quality data records for the heavily impaired media stream of FIG. 7.

At the end the bins 14, 5, 3, 8, 8, 5 and 36 have been incremented leading to the frequency distribution as shown in FIG. 8. Also in this considered scenario of a heavily impaired media stream, no clear maximum can be detected in the frequency distribution. Yet due to the mechanism for advancing the reference QDR it might happen that the frequency distribution may indicate a periodic impairment. In order to avoid drawing wrong conclusions (it may be expected that the source of error leading to the heavy impairment is not periodic although this might happen to be indicated in the frequency distribution), additional criteria, such as determining whether at least 50% or more of the accounted QDRs of the frequency distribution are within the bin showing the maximum and/or a threshold impairment ratio of the media stream (e.g. 33%) could be considered. Specifically, the latter criterion would avoid that heavily corrupted streams (that exceed the threshold impairment ratio) are considered to have periodic impairments even though this might be (accidentally) indicated by the frequency distribution.

Figure 9:
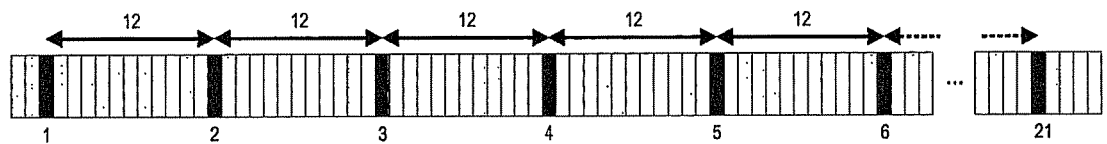
FIG. 9 shows an exemplary, periodically impaired media stream.
Figure 10:
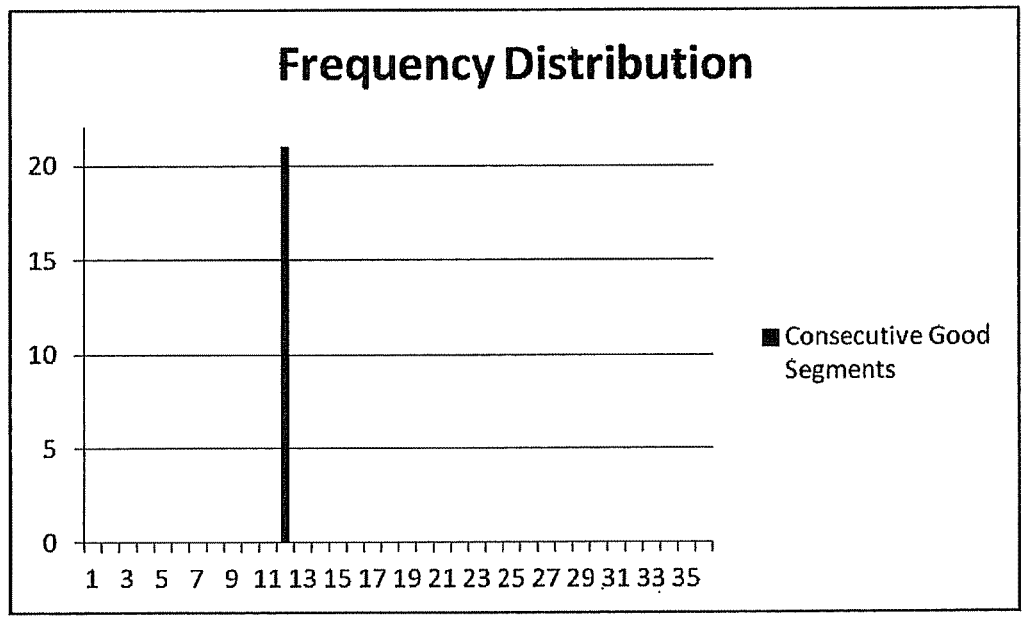
FIG. 10 shows a frequency distribution of the number of (consecutive) good quality data records in between two (successive) impaired quality data records for the periodically impaired media stream of FIG. 9.
Figure 11:
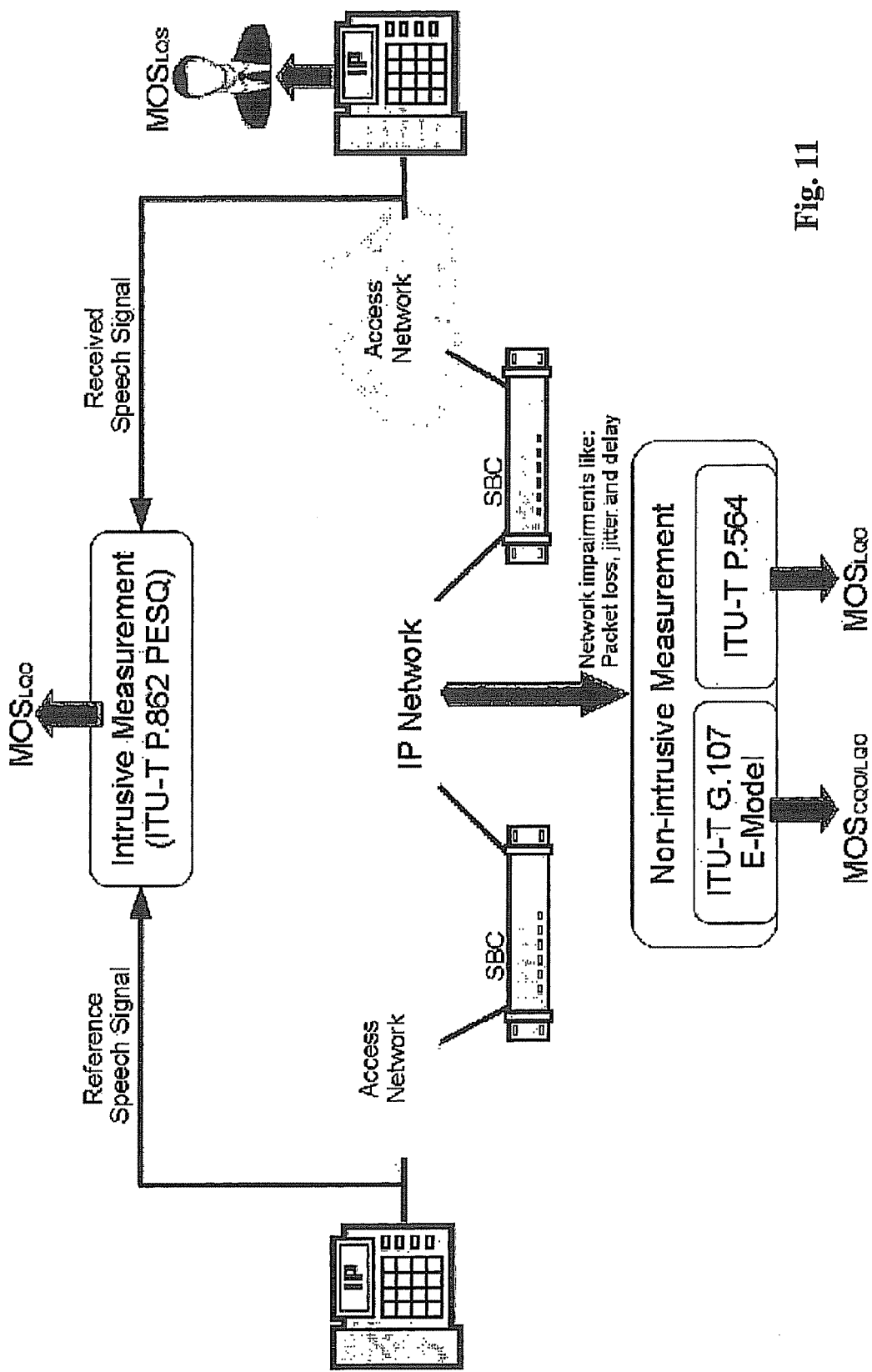
FIG. 11 shows an overview on the different measurement concepts, particularly intrusive measurements and non-intrusive measurements.

Next, a pattern of periodically impaired media stream as shown exemplarily in FIG. 9 is considered. The dark-colored rectangles are again intended to show impaired QDRs, while the light-colored rectangles indicate QDRs showing no impairment. Applying the procedure of FIG. 4C, it is apparent that due to the perfect periodicity of the impaired QDRs in the media stream, only one bin in the frequency distribution would be "filled". In the shown example, only the bin corresponding to the distance of 12 (i.e. there are 11 (consecutive) good QDRs in between two impaired QDRs) is incremented for every impaired QDR, which leads to the frequency distribution of FIG. 10. This distribution clearly has a single maximum that yields the periodic impairment at a periodicity of 60 seconds (a gap of 11 consecutive good QDRs is equivalent to a 55 seconds gap, in case each QDRs refers to a 5 seconds interval of the stream, plus the time period for one additional impaired QDR).

The monitoring probe or any other network device/component implementing the principles of the invention may be considered to refer to dedicated hardware, a software program or a combination thereof to implement the desired functionality of the respective probe, respectively, network device/component. Accordingly, another embodiment of the invention relates to the implementation of the above described various embodiments using hardware and software. It is recognized that monitoring probes and network devices may be implemented by having computing devices (processors) execute a software program that causes the desired functionality being executed. A computing device or processor may for example be general purpose processors, digital signal processors (DSP), application specific integrated circuits (ASIC), field programmable gate arrays (FPGA) or other programmable logic devices, etc. Some of the computing devices may store the software program internally.

The various embodiments of the invention may also be performed or embodied by a combination of computing devices and software programs providing the desired functionality stored on any kind of computer readable storage media, for example RAM, EPROM, EEPROM, flash memory, registers, hard disks, CD-ROM, DVD, etc.

It should be further noted that the individual features of the different embodiments of the invention may individually or in arbitrary combination be subject matter to another invention.

It would be appreciated by a person skilled in the art that numerous variations and/or modifications may be made to the present invention as shown in the specific embodiments without departing from the spirit or scope of the invention as broadly described. The present embodiments are, therefore, to be considered in all respects to be illustrative and not restrictive.

What is claimed is:

1. A method for detecting periodic impairments of media streams of real-time communication sessions within a packet-switched network, the method comprising:
monitoring by a passive monitoring system a plurality of media streams, wherein monitoring comprises continuously generating, for predefined time intervals, quality data records for each monitored media stream, wherein each quality data record is indicative of a determined media stream quality of the respective media stream within the respective predefined time interval;
generating for each media stream a frequency distribution indicative of the number of good quality data records between respective pairs of quality data records indicative of an impairment of the respective media stream in their corresponding time intervals; and
determining whether a maximum exists in the media stream's frequency distribution for a given number of consecutive good quality data records, wherein in case a maximum exists, the respective media stream is determined to be periodically impaired and said given number of consecutive good quality data records for which the maximum exists indicates the periodicity in the impairment of the media stream.

2. The method according to claim 1, wherein the media stream's frequency distribution of impaired quality data records is generated by accounting for a respective quality data record of a media stream in the media stream's frequency distribution only, in case the determined media stream quality of said respective quality data record is indicating an impairment and there is at least a threshold number of consecutive good quality data records between said respective quality data record and the last quality data record of the media stream that has been accounted for in the media stream's frequency distribution.

3. The method according to claim 2, wherein said respective quality data record is accounted for in a respective bin of the media stream's frequency distribution that is corresponding to the number of consecutive good quality data records between said respective quality data record and the last quality data record of the media stream that has been accounted for in the media stream's frequency distribution, and
wherein the periodicity of the impairment is determined based on the number of quality data records accounted for in each respective bin of the media stream's frequency distribution.

4. The method according to claim 1, wherein a respective one of the generated quality data records is accounted for in the media stream's frequency distribution in case it indicates an impairment of the media stream below a threshold quality value, and is considered a good quality data record otherwise.

5. The method according to claim 1, wherein a respective media stream is determined to be periodically impaired, in case said maximum exists in the media stream's frequency distribution for a given number of consecutive good quality data records and, in addition, the number of accounted quality data records for a given number of consecutive good quality data records in the media stream's frequency distribution exceeds a threshold percentage of all quality data records that have been accounted for in the media stream's frequency distribution.

6. The method according to claim 1, wherein a periodic impairment of a respective media stream is only determined, in case said maximum exists in the media stream's frequency distribution for a given number of consecutive good quality data records and, in addition, the ratio between the total number of quality data records accounted for in the frequency distribution and the total number of quality data records of the media stream indicating an impairment of the media stream is below an impairment threshold ratio.

7. The method according to claim 6, wherein the quality data records accounted for in the frequency distribution of a media stream are quality data records of the respective media stream which indicate a determined media stream quality below a threshold quality value.

8. The method according to claim 1, further comprising:
maintaining a media stream context for each media stream, and
adding a periodic impairment indicator to the media stream context upon termination of the respective media stream, wherein periodic impairment indicator indicates whether the respective media stream has been determined to having been subject to a periodic impairment or not.

9. The method according to claim 8, further comprising adding the information on the determined periodicity of the impairment of the respective media stream to the media stream context, if the respective media stream has been determined to having been subject to a periodic impairment.

10. The method according to claim 8, further comprising adding a modulus of the periodic impairment of the respective media stream to the media stream context, if the respective media stream has been determined to having been subject to a periodic impairment.

11. The method according to claim 10, wherein the modulus is calculated by dividing the point in time of the start or end of the predetermined time interval of a quality data record accounted for in the frequency distribution of the media stream, expressed in seconds relative to a reference, by the periodicity of the impairment, expressed in seconds.

12. The method according to claim 10, further comprising the step of correlating media streams being potentially subject to the same impairment at the same periodicity by identifying identical moduli in the media stream contexts of the media streams.

13. The method according to claim 1, wherein monitoring a plurality of media streams received by the real-time passive monitoring system comprises:
determining transport-related metrics for each of the media streams for respective predefined time intervals and
determining the media stream quality for each of the media streams within each respective predefined time interval.

14. The method according to claim 13, wherein the determined media stream quality is an estimated speech quality.

15. The method according to claim 14, wherein determining the media stream quality comprises determining a Mean Opinion Score (MOS) or R-factor value for each media stream in each predefined time interval.

16. The method according to claim 15, wherein determined media stream quality is a determined transport quality determined based on at least one of packet loss, jitter, deviations in packet inter-arrival times, packet delay, and sequence errors in the received packet sequence.

17. A system for detecting periodic impairments of media streams of real-time communication sessions within a packet-switched network, the system comprising:
one or more passive monitoring probes for monitoring a plurality of media streams, and for continuously generating, for predefined time intervals, quality data records for each monitored media stream, wherein each quality data record is indicative of a determined media stream quality of the respective media stream within the respective predefined time interval;
at least one hardware processor;
a memory adapted to store a code executable by said at least one hardware processor, said code comprises:
instructions for generating for each media stream a frequency distribution indicative of the number of good quality data records between respective pairs of quality data records indicative of an impairment of the respective media stream in their corresponding time intervals;
instructions for determining whether a maximum exists in the media stream's frequency distribution for a given number of consecutive good quality data records; and
wherein the instructions for determining whether a maximum exists in the media stream's frequency distribution comprises instructions for determining the respective media stream to be periodically impaired, in case a maximum exists, and wherein said given number of consecutive good quality data records for which the maximum exists indicates the periodicity in the impairment of the media stream.

18. The system of claim 17, wherein the at least one processing unit comprises a plurality of processing unit each comprised in each passive monitoring probe.

19. The system of claim 17, wherein the at least one processing unit is comprised in a post-processing platform for processing the quality data records for each monitored media stream.

20. A non-transitory computer readable medium storing instructions that, when executed by a processor of an apparatus, cause the apparatus to detect periodic impairments of media streams of real-time communication sessions within a packet-switched network, by:
monitoring by a passive monitoring system a plurality of media streams, wherein monitoring comprises continuously generating, for predefined time intervals, quality data records for each monitored media stream, wherein each quality data record is indicative of a determined media stream quality of the respective media stream within the respective predefined time interval;
generating for each media stream a frequency distribution indicative of the number of good quality data records between respective pairs of quality data records indicative of an impairment of the respective media stream in their corresponding time intervals; and
determining whether a maximum exists in the media stream's frequency distribution for a given number of consecutive good quality data records, wherein in case a maximum exists, the respective media stream is determined to be periodically impaired and said given number of consecutive good quality data records for which the maximum exists indicates the periodicity in the impairment of the media stream.

* * * * *